(12) United States Patent
Takenaka et al.

(10) Patent No.: US 9,514,202 B2
(45) Date of Patent: Dec. 6, 2016

(54) INFORMATION PROCESSING APPARATUS, INFORMATION PROCESSING METHOD, PROGRAM FOR INFORMATION PROCESSING APPARATUS AND RECORDING MEDIUM

(75) Inventors: Takamasa Takenaka, Shinagawa-ku (JP); Satoshi Sekine, Meguro-ku (JP)

(73) Assignee: Rakuten, Inc., Tokyo (JP)

( * ) Notice: Subject to any disclaimer, the term of this patent is extended or adjusted under 35 U.S.C. 154(b) by 130 days.

(21) Appl. No.: 13/503,591

(22) PCT Filed: Feb. 28, 2011

(86) PCT No.: PCT/JP2011/054510
§ 371 (c)(1),
(2), (4) Date: Apr. 23, 2012

(87) PCT Pub. No.: WO2011/105606
PCT Pub. Date: Sep. 1, 2011

(65) Prior Publication Data
US 2012/0209828 A1 Aug. 16, 2012

(30) Foreign Application Priority Data

Feb. 26, 2010 (JP) ................................. 2010-043390
Feb. 26, 2010 (JP) ................................. 2010-043391
Feb. 26, 2010 (JP) ................................. 2010-043392

(51) Int. Cl.
*G06F 17/00* (2006.01)
*G06F 17/30* (2006.01)

(52) U.S. Cl.
CPC .............................. *G06F 17/30563* (2013.01)

(58) Field of Classification Search
CPC .. G06Q 10/10; G06Q 30/06; G06Q 30/0601; G06Q 30/08
USPC .......................... 707/709, 804, 810; 705/26.1
See application file for complete search history.

(56) References Cited

U.S. PATENT DOCUMENTS 7,461,022 B1 * 12/2008 Churchill ............... G06Q 10/02
705/26.3
2002/0178072 A1 * 11/2002 Gusler et al. ................... 705/26

FOREIGN PATENT DOCUMENTS

JP 2002-236694 A 8/2002
JP 2008-269106 A 11/2008

OTHER PUBLICATIONS

Translated the Detailed Description of JP 2008-269106.*
Japanese Office Action mailed on Mar. 26, 2013 issued in Japanese Patent Application No. 2012-501906 which is a JP national Phase application of the PCT/JP11/054510, English Translation.

(Continued)

*Primary Examiner* — Ann J Lo
(74) *Attorney, Agent, or Firm* — Sughrue Mion, PLLC

(57) ABSTRACT

The present invention includes: acquiring plural web pages of an identical category into which targets stated in the web pages are classified (S1); acquiring an attribute-related term related to an attribute of the targets stated in the web pages or an attribute description pattern used to describe the attribute of the targets as initial data (S2); extracting the attribute-related term of the attribute matching the attribute description pattern from the plural web pages (S3); and extracting an attribute description pattern matching the attribute-related term from plural web pages (S4).

21 Claims, 21 Drawing Sheets

(56) References Cited

OTHER PUBLICATIONS

Ellen Riloff, Learning Dictionaries for Information Extraction by Multi-Level Bootstrapping, 1999, pp. 6, Proceedings of the Sixteenth National Conference on Artificial Intelligence, http://www.cs.utah.edu/~riloff/pdfs/aaai99.pdf.

Sekine, Satoshi, "Shopping Site ni Okeru Shohin no Doitsusei, Ruijisei no Suitei Shuho", Preceedings of the 16th annuanl meeting of the Association for Natural Language Processing, Mar. 8, 2010, pp. 254-257.

Sakachi, Hiroki, "Shohin Page Karano Zokusei Zokuseichi Chushutsu to Doitsu Shohin Clustering Shuho", Proceedings of the 16th annual meeting of the Assocation for Natural Language Processing, Mar. 8, 2010, pp. 371-374.

* cited by examiner

FIG. 6

```
<html>
<head>
. . . . . . . . . . . . . . . . . . . . . . . . . . . .
<title> [OOMARKET] ・・・。ツェO・OO・△△・・
. . . .
</title>
. . . . . . . . . . . . . . . . . . . . . . . . . . . .
</head>
<body>
. . . .
・・・・ツェO・OO・△△・・・・・
. . . . . . . . . . . . . . . . .
・・・・・・[FREE SHIPPING]・・・・・・・・・
・・・・・・・・・・・・[VARIETY：OOO]・・・・
. . . . . . . . . . . . . . . .
. . . . . . . . . . . . . . . . . . . . . . . . . . .
. . . . . . . . . . . . . . .
<table・・・・>
. . . .
  <td>OO</td><td>◇◇</td>
. . . .
</table>
. . . . . . . .
</body>
</html>
```

FIG. 7

| FRONT | MIDDLE | REAR |
|---|---|---|
| [ | : | ] |
| <li> | : | </li> |

} INITIAL PATTERN

| ⋮ | ⋮ | ⋮ |

| ■ | : | <br> |
|---|---|---|
| <td> | </td><td> | </td> |

| ⋮ | ⋮ | ⋮ |

FIG. 9

WINE

| ATTRIBUTE NAME | ATTRIBUTE VALUE |
|---|---|
| VARIETY | ○○○、○▼ |
| PRODUCER | △△、・・・ |
| ALCOHOL CONTENTENT | １２．５％ |

GOLF DRIVER

| ATTRIBUTE NAME | ATTRIBUTE VALUE |
|---|---|
| WEIGHT | ５０ｇ、・・・ |
| LOFT ANGLE | １０．５°、・・・ |
| SHAFT | ・・・ |

FIG. 10
●●WINE　　　　GOODS NUMBER　1 2 3 4 5
| VARIETY | ○○ |
|---|---|
| PRODUCER | △△ |
| VOLUME | 7 5 0 m l |
| PRODUCTION YEAR | YEAR 2000 |
| PRICE | ￥9 1 2 |
⋮　　　　　　　　⋮
▽▲WINE　　　　GOODS NUMBER　1 2 3 4 6
| VARIETY | ○● |
|---|---|
| PRODUCER | ▲△ |
| VOLUME | 7 5 0 m l |
| PRODUCTION YEAR | YEAR 1995 |
| PRICE | ￥2, 9 0 0 |
⋮　　　　　　　　⋮

FIG. 18

◆◆◆COMPANY　　　　　MAIL MAGAZINE [　　　] SEARCH

TOP PAGE > WINE > GERMANY

ツェ○・○○・△△　　　　　CATALOG
　　　　　　　　　　　　　　No.123456788

・・・・・・・・・・・・・
・・

VOLUME　　　750ml
CONTAINER　　BOTTLE

・・・・・・・・・・・・・
・・・・・・・・・・・

NAME OF FRUIT　　：・・・・・・・・
HARVESTING AREA　：・・・・・・・・
VINTAGE PLACE　　：・・・・・・・・
　・
　・
　・
TYPE OF TASTE：・・・・・・・・・

FIG. 19

CATALOG BY PROPRODUCTION YEAR

◆ PRODUCTION YEAR: 1995

| NAME OF WINE | VARIETY | PRODUCER | PRICE | GOODS NUMBER |
|---|---|---|---|---|
| ●●WINE | ○○ | △△ | ¥1,500 | 10461 |
| ▽▲WINE | ○● | ▲△ | ¥2,900 | 12346 |
| ⋮ | ⋮ | | ⋮ | |
| ■▽WINE | □○ | ○△ | ¥3,500 | 13354 |

◆ PRODUCTION YEAR: 1996

| NAME OF WINE | VARIETY | PRODUCER | PRICE | GOODS NUMBER |
|---|---|---|---|---|
| ●●WINE | ○○ | △△ | ¥1,300 | 13478 |
| ▽▲WINE | ○● | ▲△ | ¥2,500 | 15356 |

⋮

INFORMATION PROCESSING APPARATUS, INFORMATION PROCESSING METHOD, PROGRAM FOR INFORMATION PROCESSING APPARATUS AND RECORDING MEDIUM

CROSS REFERENCE TO RELATED APPLICATIONS

This application is a National Stage of International Application No. PCT/JP2011/054510 filed Feb. 28, 2011, claiming priority based on Japanese Patent Application Nos. 2010-043390, 2010-043391, and 2010-043392 all filed Feb. 26, 2010, the contents of all of which are incorporated herein by reference in their entirety.

TECHNICAL FIELD

The present invention relates to a technical field of an information processing apparatus, an information processing method, a program for the information processing apparatus and a recording medium which analyze web pages on Internet.

BACKGROUND ART

There are a great number of web pages which show goods in web sites on Internet, and users browse those web pages and purchase goods. To browse and purchase goods, users generally search for goods. This search technique is being improved to quickly search for goods a user wants from a great number of web pages. For example, Patent Document 1 discloses a search system for a shopping mall which devises a integer classification code table creating method of six digits by limiting a categorical search of goods to a three-layer categorical search of sequentially searching in a large category, middle category and small category, creates goods classification code table and a store classification code table using this classification code table creating method, provides these classification code tables in an Internet shopping mall, allows shops to easily register goods and store information and allows users to search for goods and stores.

PRIOR ART DOCUMENT

Patent Document

Patent Document 1: Japanese Patent Application Laid-Open No. 2002-236694

SUMMARY OF THE INVENTION

Problems to be Solved by the Invention

Meanwhile, in case of goods such as wine, information related to attributes of goods such as a place of production and volume is stated in web pages and, in case of service such as travel related service, information related to attributes of service such as a fee and access is stated in web pages. If these attributes of goods or the like can be extracted, there is a possibility that various services can be provided. However, a conventional technique as disclosed in Patent Document 1 has difficulty in extracting attributes of goods or the like.

The present invention is made in light of this problem, and an example of an object of the present invention is to provide, for example, an information providing device or the like which automatically acquires attributes of goods or the like from web pages.

Means for Solving the Problems

To solve the above problem, the invention described in claim 1 is characterized to include a web page acquiring means that acquires plural web pages of an identical category into which targets stated in web pages are classified; an initial data acquiring means that acquires an attribute-related term as initial data, related to an attribute of the target stated in the web page or an attribute description pattern used to describe the attribute of the target; an attribute extracting means that extracts the attribute-related term of the attribute matching the attribute description pattern, from the plural web pages; and an attribute description pattern extracting means that extracts the attribute description pattern matching the attribute-related term, from the plural web pages.

The invention described in claim 2 is characterized in that in the information processing apparatus described in claim 1, the information processing apparatus further includes a repeating means that alternately repeats the attribute extracting means and the attribute description pattern extracting means.

The invention described in claim 3 is characterized in that in the information processing apparatus described in claim 1 or 2, the attribute extracting means extracts an attribute name of the attribute as the attribute-related term.

The invention described in claim 4 is characterized in that in the information processing apparatus described in any one of claims 1 to 3, the information processing apparatus further includes: an attribute list generating means that generates an attribute list from the extracted attribute-related term; and a pattern list generating means that generates a pattern list of the extracted attribute description pattern.

The invention described in claim 5 is characterized in that in the information processing apparatus described in any one of claims 1 to 4, the information processing apparatus further includes: an attribute scoring means that scores the attribute-related term and an attribute selecting means that ranks the attribute-related term in order of the score, and selects an attribute-related term of a predetermined rank or more.

The invention described in claim 6 is characterized in that in the information processing apparatus described in claim 5, the attribute scoring means scores the attribute-related term based on a number of hits of search for the attribute-related term.

The invention described in claim 7 is characterized in that in the information processing apparatus described in claim 5, in a web site having plural stores which sell the target, the attribute scoring means scores the attribute-related term based on a number of the stores of web pages that the attribute-related term appears therein.

The invention described in claim 8 is characterized in that in the information processing apparatus described in any one of claims 1 to 7, the information processing apparatus further includes an attribute filtering means that removes the attribute-related term appearing in plural web pages of a category different from the category.

The invention described in claim 9 is characterized in that in the information processing apparatus described in any one of claims 1 to 8, the information processing apparatus further includes an attribute description pattern scoring means that scores the attribute description pattern and an attribute description pattern selecting means that ranks the attribute description pattern in order of the score and selects an attribute description pattern of a predetermined rank or more.

The invention described in claim 10 is characterized in that in the information processing apparatus described in claim 9, the attribute description pattern scoring means scores the attribute description pattern based on a co-occurrence count that the attribute-related term and the attribute description pattern appear together thereat.

The invention described in claim 11 is characterized in that in the information processing apparatus described in any one of claims 1 to 10, the information processing apparatus further includes an attribute name similarity determining means that determines whether or not the attribute names are similar; and an attribute name aggregating means that aggregates attribute names that are determined to be similar by the attribute name similarity determining means.

The invention described in claim 12 is characterized in that in the information processing apparatus described in claim 11, the attribute extracting means extracts the attribute name and an attribute value matching the attribute name as the attribute-related terms, and the attribute name aggregating means aggregates the attribute name based on the attribute name.

The invention described in claim 13 is characterized in that in the information processing apparatus described in any one of claims 1 to 10, the web page acquiring means acquires a web page of a supply source of the target, and the information processing apparatus further includes an attribute-related term comparing means that extracts a supply source target attribute-related term from a web page of a supply source of the target by means of the initial data acquiring means, the attribute extracting means and the attribute description pattern extracting means, and compares the supply source target attribute-related term and the attribute-related term.

The invention described in claim 14 is characterized in that in the information processing apparatus described in any one of claims 1 to 13, the information processing apparatus further includes a catalog generating means that generates a catalog that states the attribute-related term, based on the extracted attribute-related term.

The invention described in claim 15 is characterized in that in the information processing apparatus described in any one of claims 1 to 14, the information processing apparatus further includes a web page extracting means that extracts web pages in which the number of times of appearance of the attribute-related term is equal to or less than a predetermine number of times, from the plural web pages.

The invention described in claim 16 is characterized in that in the information processing apparatus described in claim 15, the web page extracting means extracts web pages in which the number of times of appearance of the attribute-related term is zero.

The invention described in claim 17 is characterized in that in the information processing apparatus described in any one of claims 1 to 16, the information processing apparatus further includes a web page attribute grouping means that groups the plural web pages based on the attribute-related term.

The invention described in claim 18 is characterized in that an information processing method of processing information in an information processing apparatus includes: a web page acquiring step of acquiring plural web pages of an identical category into which targets stated in the web pages are classified; an attribute description pattern acquiring step of acquiring an attribute description pattern used to describe an attribute of a target stated in the web page; an attribute extracting step of extracting the attribute-related term of the attribute matching the attribute description pattern, from the plural web pages; and an attribute description pattern extracting step of further extracting the attribute description pattern used in the attribute extracting step based on the extracted attribute-related term, from the plural web pages.

The invention described in claim 19 is characterized in that an information processing method of processing information in an information processing apparatus includes: a web page acquiring step of acquiring plural web pages of an identical category into which targets stated in the web pages are classified; an attribute-related term acquiring step of acquiring an attribute-related term related to an attribute of a target stated in the web page; an attribute description pattern extracting step of extracting an attribute description pattern used to describe the attribute and matching the attribute-related term, from the plural web pages; and an attribute-related term extracting step of further extracting an attribute-related term used in the attribute description pattern extracting step based on the extracted attribute-related term, from the plural web pages.

The invention described in claim 20 is characterized by causing a computer to function as: a web page acquiring means that acquires plural web pages of an identical category of which targets stated in web pages are classified thereinto; an initial data acquiring means that acquires as initial data an attribute-related term related to an attribute of the target stated in the web page or an attribute description pattern used to describe the attribute of the target; an attribute extracting means that extracts the attribute-related term of the attribute matching the attribute description pattern, from the plural web pages; and an attribute description pattern extracting means that extracts the attribute description pattern matching the attribute-related term, from the plural web pages.

The invention described in claim 21 is characterized by recording a program for an information processing apparatus recorded thereon that causes a computer to function as: a web page acquiring means that acquires plural web pages of an identical category of which targets stated in web pages are classified thereinto; an initial data acquiring means that acquires, as initial data, an attribute-related term related to an attribute of the target stated in the web page or an attribute description pattern used to describe the attribute of the target; an attribute extracting means that extracts the attribute-related term of the attribute matching the attribute description pattern from the plural web pages; and an attribute description pattern extracting means that extracts the attribute description pattern matching the attribute-related term from the plural web pages.

Effect of the Invention

According to the present invention, by acquiring plural web pages of an identical category into which targets stated in web pages are classified, acquiring an attribute-related term related to an attribute of the targets stated in the web pages or an attribute description pattern used to describe the attribute of the targets as initial data, extracting the attribute-related term of the attribute matching the attribute description pattern from the plural web pages, and extracting the attribute description pattern matching the attribute-related term from plural web pages, it is possible to extract the attribute-related term and extract the attribute description pattern from plural web pages of the identical category or to extract attribute description pattern and extract the attribute-related term, and, consequently, it is possible to accurately acquire the attributes included in the identical category.

BRIEF DESCRIPTION OF THE DRAWINGS

FIG. 6 is an explanatory view illustrating an example of a source code of the web page in FIG. 5.

FIG. 7 is a schematic diagram illustrating an example of an attribute description pattern stored in an attribute description pattern database in FIG. 2.

FIG. 9 is a schematic diagram illustrating an example of the extracted attribute/attribute value.

FIG. 10 is a schematic diagram illustrating an example of a generated a catalog of goods or the like.

FIG. 18 is an explanatory view illustrating an example of a web page of a supply source of goods or the like.

FIG. 19 is a schematic diagram illustrating an example of a generated catalog of goods or the like.

BEST MODES FOR CARRYING OUT THE INVENTION

Hereinafter, embodiments of the present invention will be described with reference to the attached drawings.

(First Embodiment)
[1. Overview of Configuration and Function of Information Processing System]

First, a configuration and function of an information processing system according to the first embodiment of the present invention will be described using FIG. 1.

Figure 1:
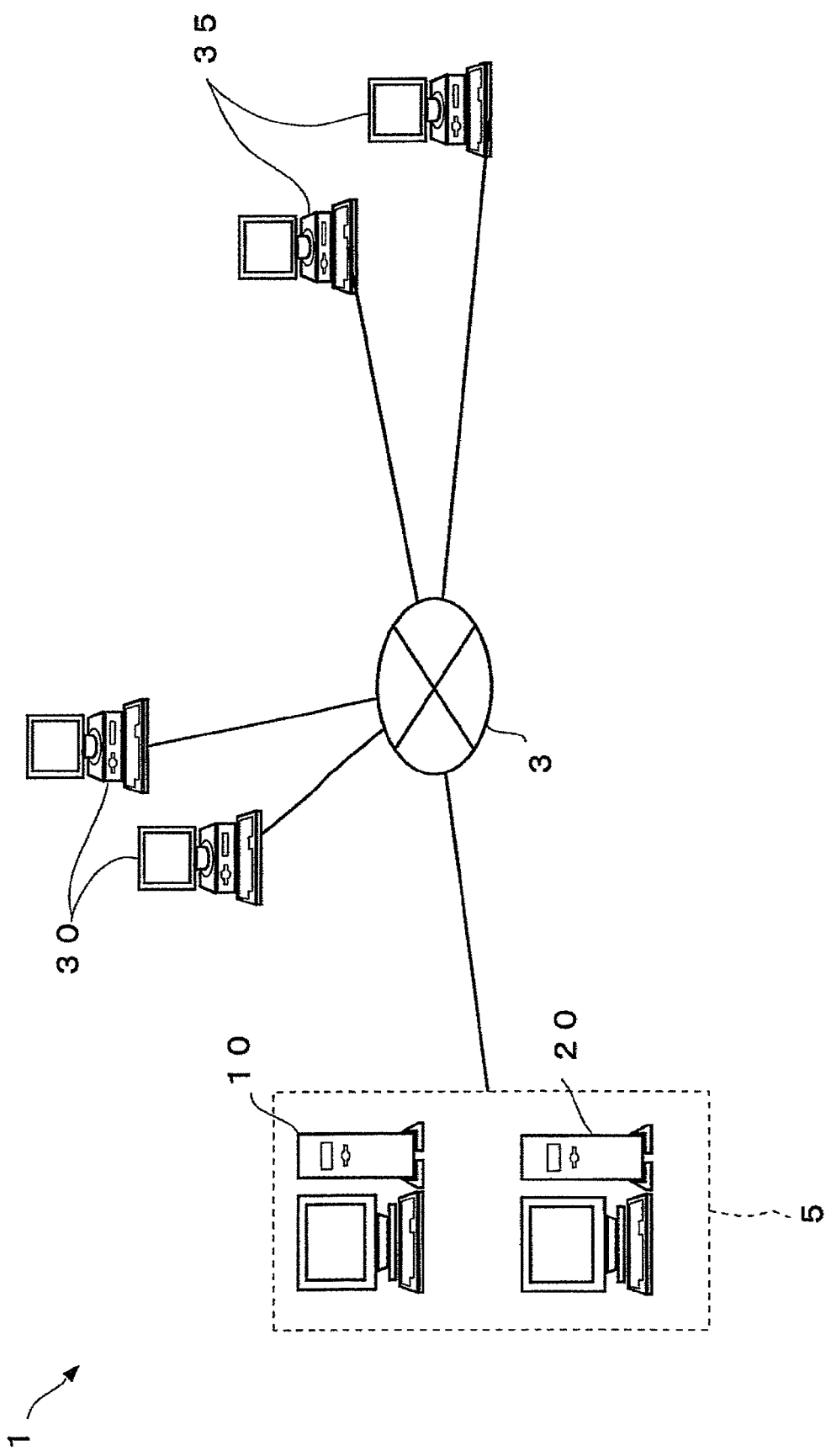
FIG. 1 is a schematic diagram illustrating a schematic configuration example of an information processing system according to a first embodiment of the present invention.

FIG. 1 is a schematic diagram illustrating a schematic configuration example of an information processing system 1 according to the present embodiment.

As illustrated in FIG. 1, the information processing system 1 includes an information processing server (an example of an information processing apparatus) 10 which generates a catalog of goods or the like from web pages and extracts web pages registered in a wrong category; an information providing server 20 for running a shopping site or for a blog, store owner terminals 30 of store owners who open shops in the shopping site, and user terminals 35 through which users purchase goods or the like at a shopping site (including services provided at a shopping site) and to post blogs. In addition, goods or the like and blogs are examples of targets stated in web pages.

A server system (an example of the response determination apparatus) 5 is configured such that the information processing server 10 and information providing server 20 are connected to each other by a local area network (LAN) or the like and are configured to perform transmission and reception of data with each other. The server system 5, store owner terminals 30 and user terminals 35 are connected via a network 3, and can transmit and receive data to and from each other by applying TCP/IP or the like as a communication protocol. In addition, the network 3 is constructed with, for example, the Internet, a dedicated communication line (for example, a community antenna television (CATV) line), a mobile communication network (including a base station and the like), a gateway, or the like.

The information processing system 1 functions as a catalog generating system which generates a catalog from web pages or a web page extracting system which extracts web pages registered in a wrong category.

The information processing server 10 generates a catalog of goods or the like from web pages registered in the information providing server 20 or the like, and enables the catalog to be browsed from the user terminals 35 or the like. Further, the information processing server 10 extracts web pages registered in a wrong category from web pages registered in the information providing server 20 or the like, organizes the web pages on the information providing server 20 based on the extraction result and notifies of the extraction result to the store owner terminals 30 such as store owners which registered web pages.

The information providing server 20 functions as a web server for selling goods or the like at a shopping site or a database server, and performs various processing of receiving registration of web pages, registering users and performing purchasing procedure of goods or the like. Further, the information providing server 20 includes web pages classified per category of goods or the like. Furthermore, the information providing server 20 accepts user's posting of a blog, and classifies and puts the blog on Internet per category based on content of the blog or the like.

The store owner terminal 30 used by the store owner is a personal computer or a mobile terminal such as a mobile wireless telephone or a Personal Digital Assistant (PDA). The store owner uses the store owner terminal 30, and registers or updates the web page in the information providing server 20.

The user terminal 35 used by the user is a personal computer or a mobile terminal such as a mobile wireless telephone or PDA. The user uses the user terminal 35 to search for goods or the like or purchase goods or the like.

[2. Configuration and Function of Each Server]

(2.1 Configuration and Function of Information Processing Server 10)

Next, the configuration and function of the information processing server 10 will be described using FIG. 2.

Figure 2:
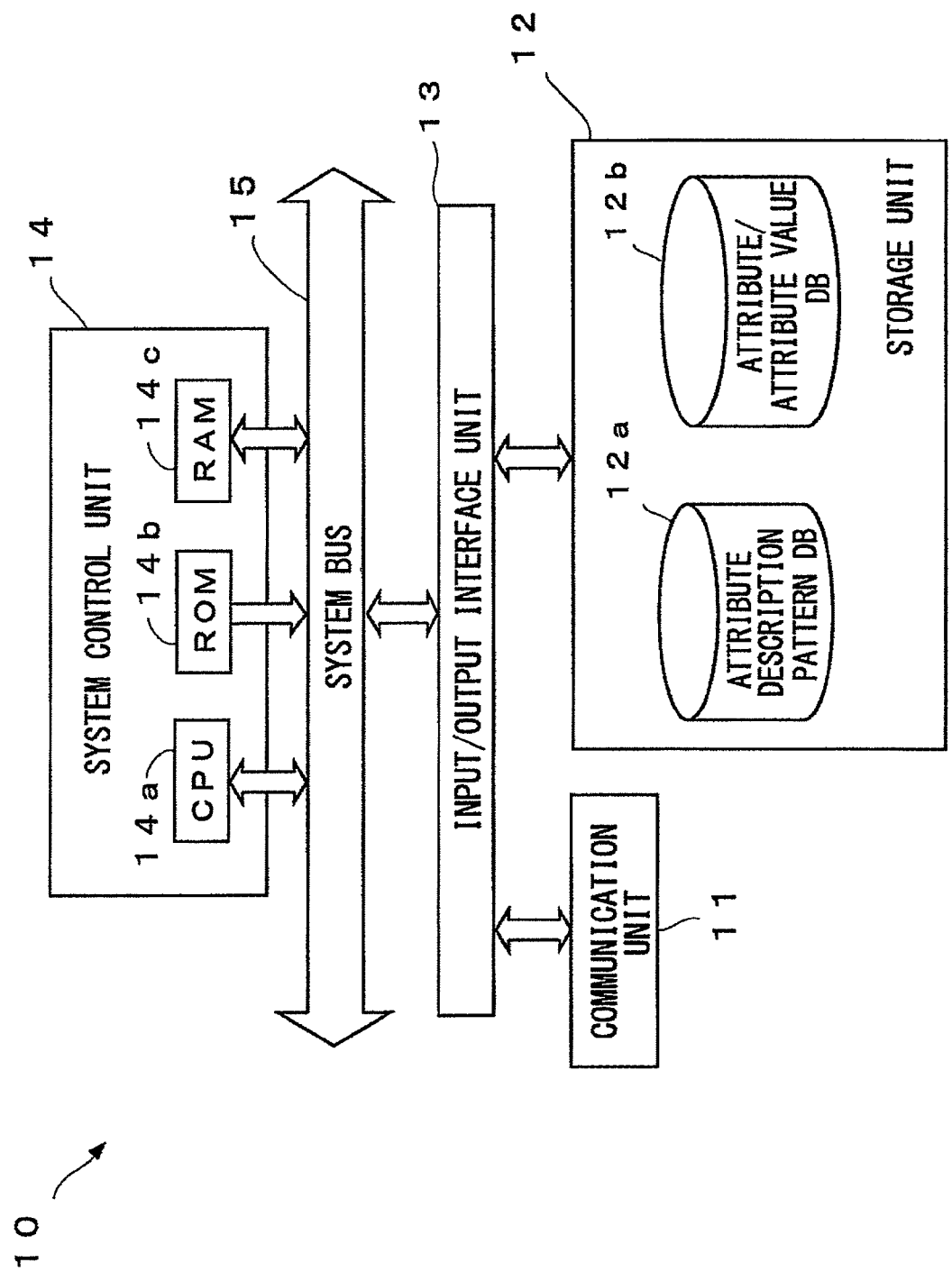
FIG. 2 is a block diagram illustrating an example of a schematic configuration of the information processing server in FIG. 1.

FIG. 2 is a block diagram illustrating an example of a schematic configuration of the information processing server 10.

As illustrated in FIG. 2, the information processing server 10 functioning as a computer includes a communication unit 11, a storage unit 12, an input/output interface unit 13, and a system control unit 14. The system control unit 14 and input/output interface unit 13 are connected through a system bus 15.

The communication unit 11 is connected to the network 3, and controls a communication state with the user terminals 35 or the like. Further, the communication unit 11 is connected to the local area network, and performs transmission and reception of data with another server such as the information providing server 20 or the like.

The storage unit 12 is configured, for example, with a hard disk drive, and stores various programs such as an operating system and server programs, data, and the like. In addition, for example, the various programs may be acquired through the network 3 from other server apparatuses or the like, or may be recorded in a recording medium and read through a drive device.

Further, in the storage unit 12, for example, an attribute description pattern database (hereinafter referred to as an "attribute description pattern DB") 12a, and an attribute/attribute value database (hereinafter referred to as an "attribute/attribute value DB") 12b are constructed.

In the attribute description pattern DB 12a, initial data of an attribute description pattern used to describe attributes of goods or the like and blogs, and attribute description patterns extracted from web pages are stored. In addition, the attributes of a blog include a category of the blog.

In the attribute/attribute value DB 12b, attribute names and attribute values related to attributes of goods or the like extracted from web pages are stored as an example of processing of the information processing server 10. Here, an example of an attribute-related term includes only an attribute name, a phrase including the attribute name or a pair of an attribute name and attribute value. Further, expression of an attribute/attribute value includes the case when the attribute and attribute value make a pair, and specifically, also includes the case when an attribute name or attribute value make a pair.

Next, the input/output interface unit 13 performs interface processing between the communication unit 11 and storage unit 12, and the system control unit 14.

The system control unit 14 is configured with a central processing unit (CPU) 14a, read only memory (ROM) 14b, random access memory (RAM) 14c, and the like. The system control unit 14 extracts attribute names and attribute values matching an attribute description pattern from plural web pages or generates a catalog of goods or the like from the extracted attribute names and attribute values, by reading and executing various programs stored in the ROM 14b or the storage unit 12 through the CPU 14a. Furthermore, the system control unit 14 extracts web pages in which the number of times of appearance of the attribute name of the attribute is a predetermined number of times or less, from plural web pages as web pages registered in a wrong category.

(2.2 Configuration and Function of Information Providing Server 20)

Next, the configuration and function of the information providing server 20 will be described using FIG. 3.

Figure 3:
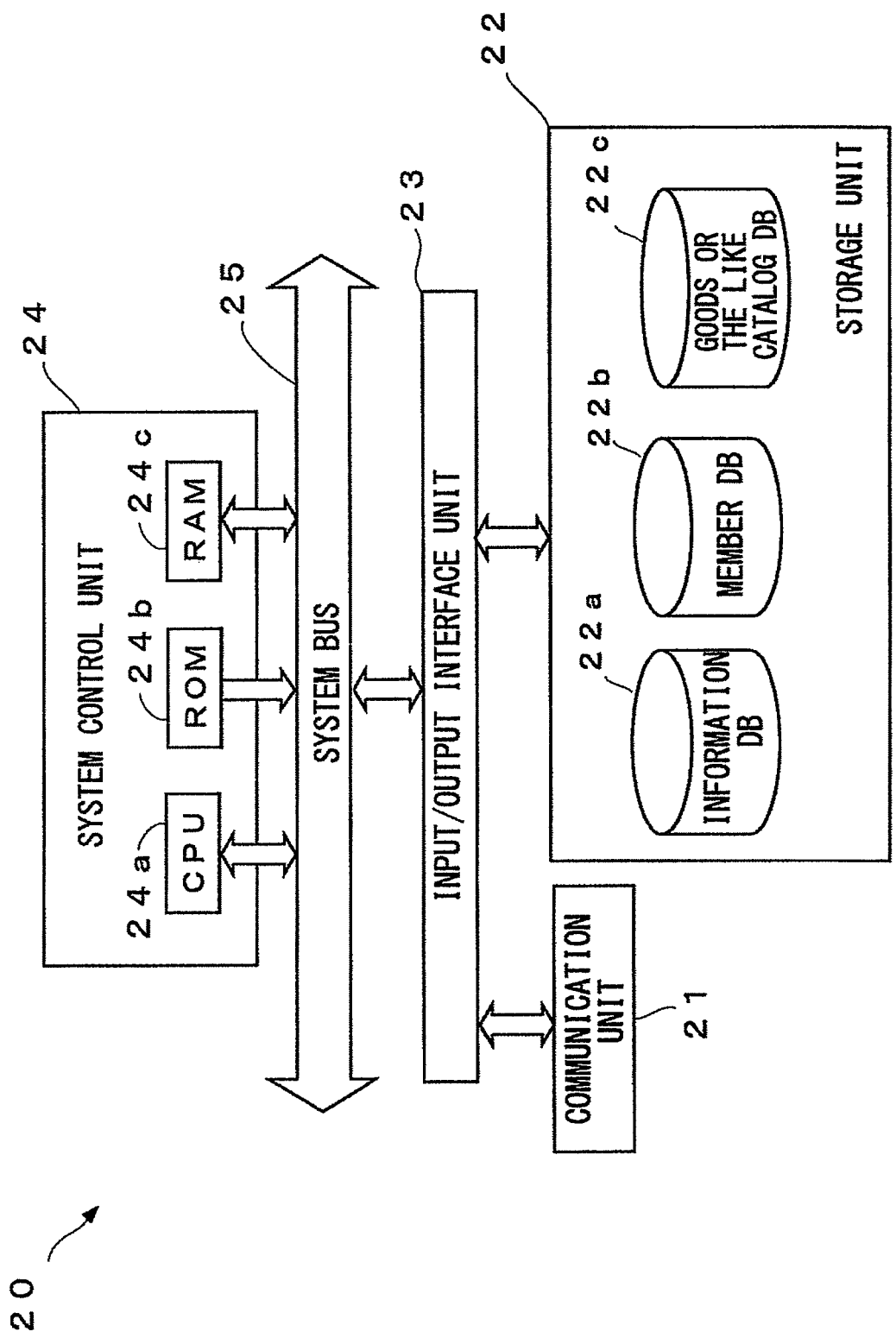
FIG. 3 is a block diagram illustrating an example of a schematic configuration of a shopping server in FIG. 1.

FIG. 3 is a block diagram illustrating an example of a schematic configuration of the information providing server 20.

As illustrated in FIG. 3, the information providing server 20 includes a communication unit 21, a storage unit 22, an input/output interface unit 23 and a system control unit 24, and the system control unit 24 and input/output interface unit 23 are connected via a system bus 25. In addition, the configuration and function of the information providing server 20 are substantially the same as the configuration and function of the information processing server 10, and therefore differences from each configuration and each function of the information providing server 20 will be mainly described.

The communication unit 21 controls a communication status with the store owner terminals 30, user terminals 35, information processing server 10, or the like via the network 3, the local area network, or the like.

In the storage unit 22 a goods database (hereinafter referred to as an "information DB") 22a, a member database (hereinafter referred to as a "member DB") 22b and a goods or the like catalog database (hereinafter referred to as a "goods or the like catalog DB") 22c are constructed.

In the information DB 22a, information related to goods, services, blogs or the like which are examples of targets stated in web pages are stored. For example, in the information DB 22a, goods information such as a goods name (including a service name), a type, an image of goods, an image related to service, a specification and a summary of introduction of goods or the like which are associated with a goods ID which is an identifier for identifying goods or the like, and advertisement information are stored. Further, in the information DB 22a, an article of a blog posted by the user is categorized and stored. Furthermore, in the information DB 22a, files of web pages described by a markup language such HyperText Markup Language (HTML), Extensible Markup Language (XML) or the like are stored. Still further, in the information DB 22a, information of goods supply source such as production source information (including a production source domain) and distribution source information (including a distribution source domain) is stored, and a goods ID of each goods is associated with, for example, a Uniform Resource Locator (URL) of a web page of goods supply source which states official information of each goods.

In the member DB 22b, user information such as user IDs, names, addresses, telephone numbers, and mail addresses of users registered as members (customers of Internet shops) is registered. This user information can be distinguished per user according to the user ID. Further, in the member DB 22b, user IDs, log-in IDs and passwords which are required when users log in a site of an Internet shops using the user terminals 35 are registered. Here, the log-in ID and password are log-in information used for log-in processing (authentication processing of the user).

In the goods or the like catalog DB 22c, a catalog of goods or the like generated by the information processing server 10 is stored per goods category and per goods.

The system control unit 24 is configured with a CPU 24a, a ROM 24b, RAM 24c, and the like. Further, by CPU 24a reading and executing various programs stored in the ROM 24b and storage unit 22, the system control unit 24 allows the store owner to register or update a web page or allows the user to perform goods purchase processing or record a purchase history of goods per user ID. Furthermore, in response to a request from the user terminal 35, information of the catalog of goods or the like is transmitted.

[3. Operation of System of Generating Catalog of Goods or the Like According to First Embodiment]

Next, the operation of the catalog generating system of the information processing system 1 according to one embodiment of the present invention will be described using FIGS. 4 to 11.

Figure 4:
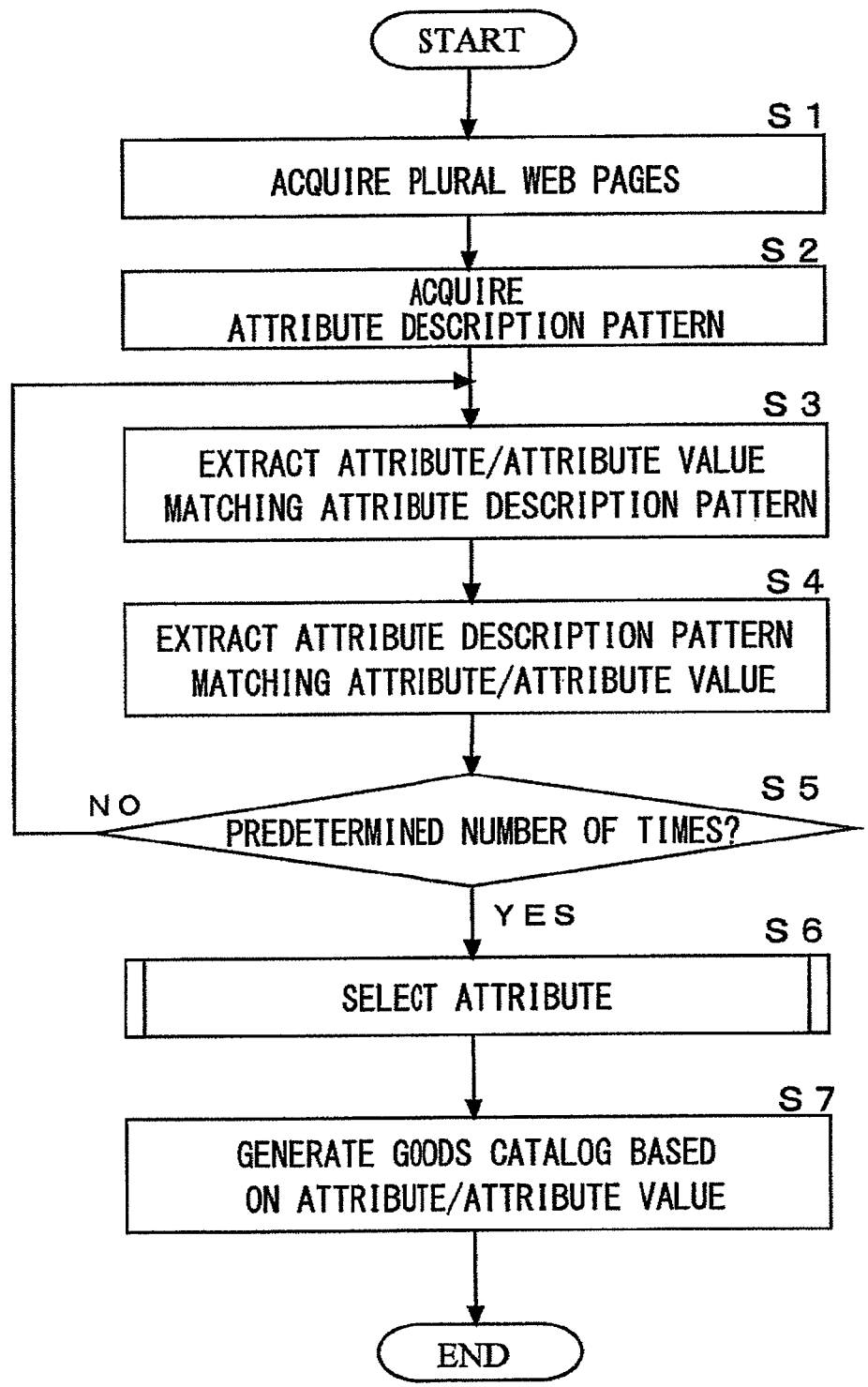
FIG. 4 is a flowchart illustrating an operation example of generating a catalog in the information processing server in FIG. 1.
Figure 5:
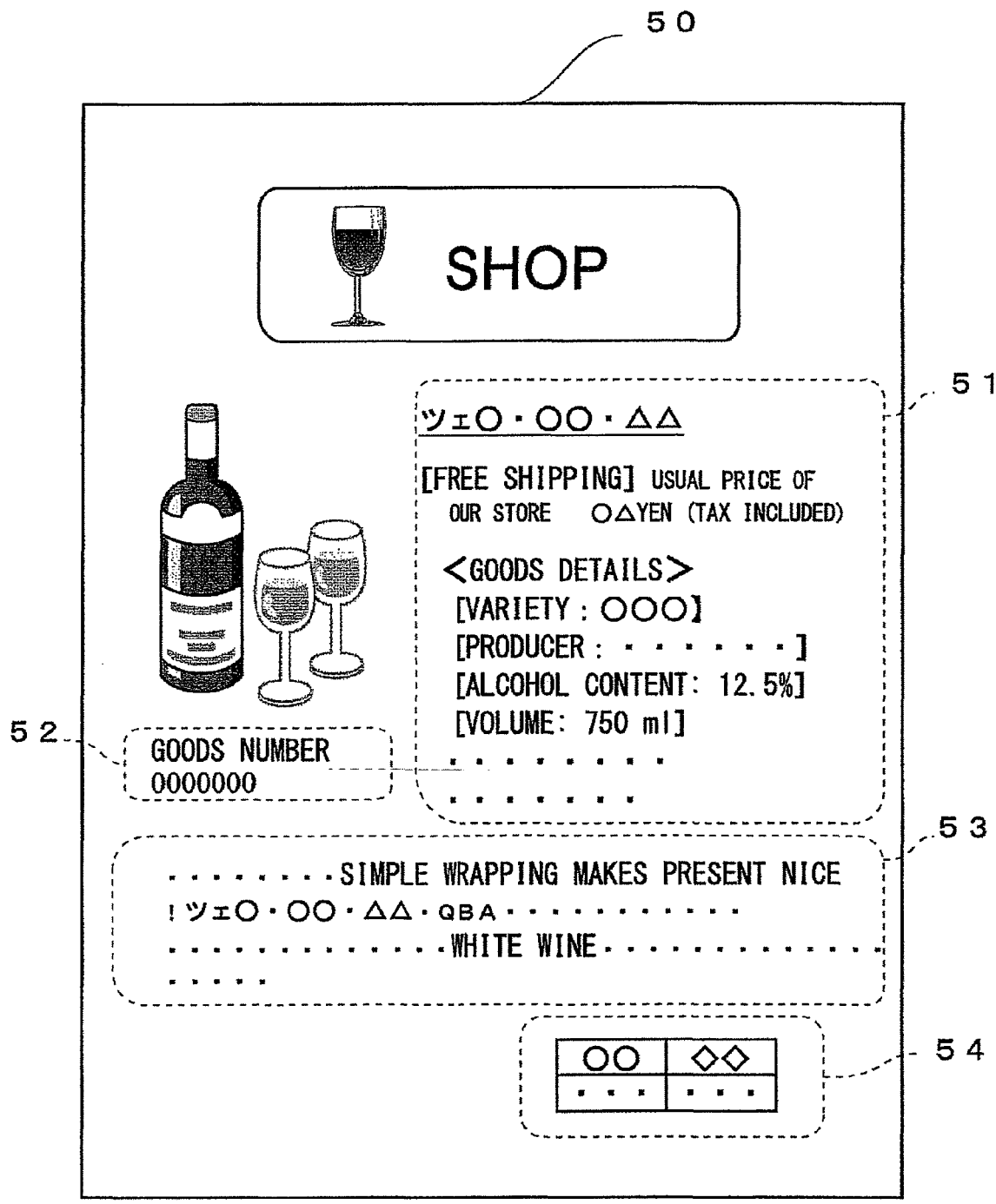
FIG. 5 is an explanatory view illustrating an example of a web page of the shopping server in FIG. 1.
Figure 8:
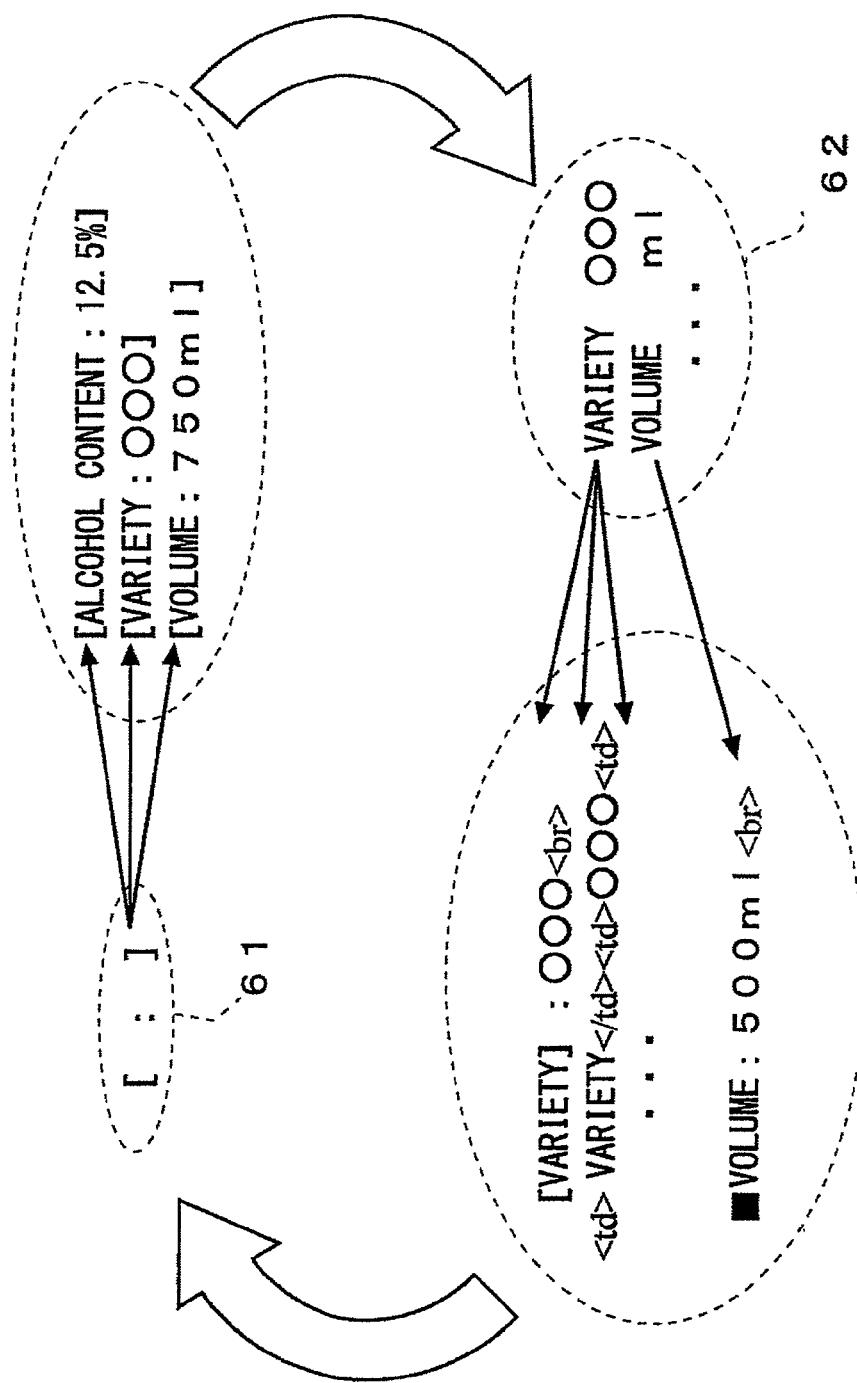
FIG. 8 is a schematic diagram illustrating an example of how an attribute/attribute value is extracted.
Figure 11:
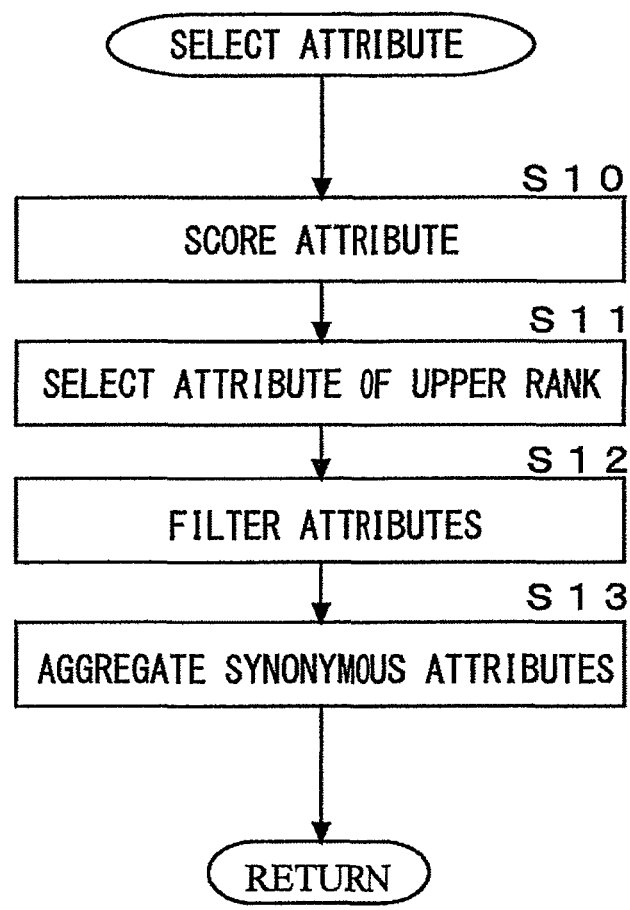
FIG. 11 is a flowchart illustrating an example of a subroutine of attribute selection in the information processing server in FIG. 1.

FIG. 4 is a flowchart illustrating an operation example of extracting web pages in the information processing server 10. FIG. 5 is an explanatory view illustrating an example of a web page of the information providing server 20. FIG. 6 is an explanatory view illustrating an example of a source code of a web page. FIG. 7 is a schematic diagram illustrating an example of an attribute description pattern stored in an attribute description pattern DB. FIG. 8 is a schematic diagram illustrating an example of how an attribute/attribute value is extracted. FIG. 9 is a schematic diagram illustrating an example of the extracted attribute/attribute value. FIG. 10 is a schematic diagram illustrating an example of a generated catalog of goods or the like. FIG. 11 is a flowchart illustrating an example of a subroutine of attribute selection in the information processing server 10.

(3.1. Flow of Generating Catalog of Goods or the Like)

First, the flow of generating a catalog of goods or the like will be described using FIG. 4.

As illustrated in FIG. 4, the information processing server 10 acquires plural web pages (step S1). Specifically, the system control unit 14 of the information processing server 10 acquires all web pages of the identical category to which goods belong in a shopping site run by the information providing server 20, from the information DB 22a through the communication unit 11. Further, specifically, as illustrated in FIG. 5, a web page 50 or the like including text data of text portions 51, 52, 53 and 54 is acquired. Further, as illustrated in FIG. 6, the source code of the web page 50 is described by, for example, the markup language or the like such as HTML. As described above, the system control unit 14 and communication unit 11 of the information processing server 10 function as an example of a web page acquiring means to acquire plural web pages of an identical category among categories into which targets stated in the web pages are classified.

Next, the information processing server 10 acquires an attribute description pattern (step S2). Specifically, as illustrated in FIG. 7, the system control unit 14 of the information processing server 10 acquires the initial attribute description pattern as initial data of a bootstrap method in following steps S3 to S5, from the attribute description pattern list of the attribute description pattern DB 12a. Here, as illustrated in FIG. 7, the attribute description pattern includes a front portion, a middle portion and a rear portion, and, for example, in case of the attribute description pattern "[:]", the front portion is "[", the middle portion is ":" and the rear portion is "]". The phrase between the front portion and middle portion is an attribute name, and the phrase between the middle portion and rear portion is an attribute value. Further, there are cases where the attribute description pattern includes an element of a HTML tag. Thus, the system control unit 14 of the information processing server 10 functions as an example of an initial data acquiring means to acquire an attribute description pattern used to describe attributes of a target stated in web pages as initial data.

Next, the information processing server 10 extracts an attribute/attribute value matching an attribute description pattern (step S3). Specifically, as illustrated in FIG. 8, the system control unit 14 of the information processing server 10 picks up a portion (for example, "[variety: ooo]") of the phrase matching, for example, the attribute description pattern 61 from plural web pages such as the web page 50, and extracts, for example, the attribute name "variety" and attribute value "ooo" matching the attribute name "variety". Further, the extracted attribute name and attribute value are stored in the attribute/attribute value DB 12b as an attribute list. Here, a special character matching all patterns, that is, wild cards such as "*" and "?" and the attribute description pattern are used to extract an attribute/attribute value. In addition, examples of an attribute/attribute value include, for example, [accommodation charge: ooo] in case of travel related service, and [site: ooo] in case where an event is introduced in a blog.

As described above, the system control unit 14 of the information processing server 10 functions as an example of an attribute extracting means to extract an attribute-related term of attributes matching the attribute description pattern, from plural web pages. Further, the system control unit 14 of the information processing server 10 functions as an example of an attribute extracting means to extract the attribute name of an attribute as an attribute-related term. Furthermore, the system control unit 14 of the information processing server 10 functions as an attribute list generating means to generate an attribute list from the extracted attribute-related term.

Next, the information processing server 10 extracts the attribute description pattern matching the attribute/attribute value (step S4). Specifically, as illustrated in FIG. 8, the system control unit 14 of the information processing server 10 picks up (for example, <td> variety </td><td>ooo<td>) matching an attribute/attribute value 62 (for example, the attribute name "variety" and attribute value "ooo"), and extracts, for example, the attribute description pattern from plural web pages such as the web page 50. Further, as illustrated in FIG. 7, the extracted attribute description pattern is added to the attribute description pattern list, and is stored in the attribute description pattern DB 12a. In addition, a wild card such as "volume *ml" may be used for an attribute value instead of the extracted attribute value itself.

As described above, the system control unit 14 of the information processing server 10 functions as an example of an attribute description pattern extracting means to extract the attribute description pattern matching attribute-related term, from plural web pages. Further, the system control unit 14 of the information processing server 10 functions as a pattern list generating means to generate a pattern list of the extracted attribute description pattern.

Next, the information processing server 10 determines a predetermined number of times (step S5). Specifically, the system control unit 14 of the information processing server 10 determines whether or not the number of times of repeating execution of steps S3 and S4 reaches the predetermined number of times. Further, when the number of times of repetition does not reach the predetermined number of times (step S5: NO), the system control unit 14 of the information processing server 10 returns to step S3, and extracts anew attribute/attribute value according to the extracted new attribute description pattern. The system control unit 14 of the information processing server 10 repeats steps S3 and S4 until the number of times of repetition reaches the predetermined number of times.

As described above, from steps S2 to S4, the system control unit 14 of the information processing server 10 executes: an attribute description pattern acquiring step of acquiring an attribute description pattern used to describe the attribute of goods; an attribute extracting step of extracting the attribute-related term of the attribute matching the attribute description pattern; and an attribute description pattern extracting step of further extracting the attribute description pattern used in the attribute extracting step, from plural web pages based on the extracted related term. The system control unit 14 of the information processing server 10 functions as an example of a repeating means of alternately repeating the attribute extracting means and attribute description pattern extracting means.

When the number of times of repetition reaches the predetermined number of times (step S5: YES), the information processing server 10 selects the attribute (step S6). Specifically, the system control unit 14 of the information processing server 10 selects the attribute from the attribute name and attribute value extracted in step S3 according to the subroutine of attribute selection. With the subroutine of attribute selection, the system control unit 14 of the information processing server 10 scores and ranks attributes, removes attributes of noise and aggregates synonymous attributes (details will be described below). As illustrated in FIG. 9, in the category of "wine", attribute values are acquired for the attribute names "variety", "producer" or the like, respectively.

Next, the information processing server 10 generates the catalog of goods or the like based on the attribute/attribute value (step S7). Specifically, as illustrated in FIG. 10, the system control unit 14 of the information processing server 10 and generates the catalog of goods or the like by aligning the attribute names per goods, and making a pair of the attribute name and attribute value. In addition, as illustrated in FIG. 10, images of goods may be added to the catalog of goods or the like. The order of attribute names may be determined based on the score of the attribute described below.

As described above, the system control unit 14 of the information processing server 10 functions as an example of a catalog generating means to generate the catalog of goods or the like stating the attribute-related term, based on the extracted attribute-related term.

Next, the system control unit 14 of the information processing server 10 applies steps S1 to S7 to web pages of other categories, and generates the catalog of goods or the like. Further, the system control unit 14 of the information processing server 10 transmits information of the generated catalog of goods or the like to the information providing server 20 and stores the information in the goods or the like catalog DB 22c.

(3.2. Attribute Selection)

Next, the subroutine of attribute selection will be described using FIG. 11.

As illustrated in FIG. 11, the information processing server 10 scores attributes (step S10). Specifically, when a shopping site includes plural stores which sell goods, that is, when the shopping site configures a cyber mall, the system control unit 14 of the information processing server 10 counts the number of stores with web pages in which attribute names appear, and scores the attributes.

It is assumed that the attribute name which is an example of the attribute-related term appearing in web pages of various stores is adequate as the attribute. For example, the attribute "variety" which is an adequate attribute in web pages of wine appears in web pages of various stores. By contrast with this, an inadequate attribute which matches with one of attribute description patterns is frequently acquired only from the web page of one store and is likely to have a low score of the attribute. As described above, the system control unit 14 of the information processing server 10 functions as an example of an attribute scoring means to score the attribute-related term. Further, the system control unit 14 of the information processing server 10 functions as an example of an attribute scoring means to score attribute-related terms based on the number of stores of web pages in which attribute-related terms appear in a web site including plural stores which sell a target stated in the web pages.

Next, the information processing server 10 selects an attribute of an upper rank (step S11). Specifically, the system control unit 14 of the information processing server 10 ranks attribute names in order from the highest score of the attribute, and selects an attribute name of a predetermined rank or more. As described above, the system control unit 14 of the information processing server 10 functions as an example of an attribute selecting means to rank the attribute-related terms in order of the scores, and select an attribute-related term of a predetermined rank or more.

Next, the information processing server 10 filters attributes (step S12). Specifically, the system control unit 14 of the information processing server 10 filters the attributes using an appearance probability of the attribute name in each category. Attributes are filtered based on an assumption that an attribute name appearing in other categories is not adequate as an attribute. For example, the phrase such as "free shipping" which is not adequate as the attribute since it appears in a great number of web pages, and therefore the appearance probability in each category has similar values. By contrast with this, although the attribute name "variety" frequently appears in web pages of the category of wine, the attribute name "variety" does not appear in categories such as a golf driver or shoes, so that the appearance probability in the category of wine is higher than the appearance probability in the categories other than wine. As described above, the system control unit 14 of the information processing server 10 functions as an example of an attribute filtering means to remove the attribute-related term appearing in plural web pages of a category different from the category.

Next, the information processing server 10 aggregates synonymous attributes (step S13). Some attributes have the same concept. For example, in the category of wine, "variety", "grape type", "Grape type", "cepage" and "GRAPE fruit" are synonymous attribute names. The system control unit 14 of the information processing server 10 aggregates attribute names of the synonymous attributes by using a synonym dictionary, calculating the degree of similarity of attribute names or using an attribute value matching an attribute name. In addition, instead of aggregating attribute names of synonymous attributes, attribute names of attributes of a similar concept may be aggregated.

Specifically, when the degree of similarity of the attribute name "A" (attribute A) and attribute name "B" (attribute B) is calculated, a value obtained by multiplying the rate of the same attribute value as the attribute value of the attribute B contained among attribute values of the attribute A and the same attribute value as the attribute value of the attribute A contained among attribute values of the attribute B is calculated as the degree of similarity, the value multiplied by an entropy calculated based on these rates is calculated as the degree of similarity, the Jaccard coefficient is calculated as the degree of similarity, or the number of the same attribute value contained among attribute values of the attribute A and attribute B is calculated as the degree of similarity.

As described above, the system control unit 14 of the information processing server 10 functions as an example of an attribute name similarity determining means to determine whether or not attribute names are similar. Further, the system control unit 14 of the information processing server 10 functions as an example of an attribute name aggregating means to aggregate attribute names determined to be similar by the attribute name similarity determining means. Furthermore, the system control unit 14 of the information processing server 10 functions as an example of an attribute extracting means to extract an attribute name and attribute value matching the attribute name as attribute-related terms, and an example of an attribute name aggregating means to aggregate attribute names based on the aggregate value.

According to the present embodiment, by acquiring plural web pages of an identical category into which targets stated in web pages are classified, acquiring, as initial data, an attribute-related term related to an attribute of the targets stated in the web pages or an attribute description pattern used to describe the attribute of the targets, extracting the attribute-related term of the attribute matching the attribute description pattern from the plural web pages, and extracting the attribute description pattern matching the attribute-related term from plural web pages, it is possible to extract the attribute-related term and extract the attribute description pattern from plural web pages of the identical category, or extract attribute description pattern and extract the attribute-related term, and, consequently, it is possible to accurately acquire the attributes included in the identical category. For example, by repeatedly extracting the attribute-related term and attribute description pattern alternately, it is possible to accurately acquire attributes included in the identical category.

When the system control unit 14 of the information processing server 10 alternately repeats the attribute extracting means and attribute description pattern extracting means, it is possible to expand the attribute list or pattern list by means of bootstrap and extract the attribute other than the attribute given as an initial value. Further, it is possible to determine the degree of similarity of web pages based on this extracted attribute. Furthermore, the user can easily find a desired goods by using the catalog of goods or the like related to a web page, so that it is possible to improve user convenience.

Still further, when the system control unit 14 of the information processing server 10 generates the attribute list from the extracted attribute-related term and generates the pattern list of the extracted attribute description pattern, it is possible to accumulate attribute-related terms such as attribute names or attribute values or information of the attribute description pattern per category.

Moreover, when the system control unit 14 of the information processing server 10 scores attribute-related terms and selects an attribute-related term of an upper rank, the accuracy of an attribute representing goods or the like, or the accuracy of an attribute of a blog increases in the selected attribute-related term.

Further, when the system control unit 14 of the information processing server 10 scores attribute-related terms based on the number of stores of web pages in which attribute-related terms appear, in a web site having plural stores which sell a target, the accuracy of an attribute representing goods or the like increases upon selection of the attribute-related term. Although, for example, when the number of goods or the like handled by stores or the number of web pages is significantly different, the influence of a store which handles a great number of goods or the like is great, it is possible to cancel the influence of a specific store by scoring the attribute-related terms based on the number of stores.

Further, when the system control unit 14 of the information processing server 10 removes the attribute-related terms appearing in plural web pages of other categories, the accuracy of the attribute representing goods or the like, or the accuracy of the attribute of a blog increases by narrowing down the attribute-related terms to an attribute-related term unique to a category of the target.

Furthermore, when the system control unit 14 of the information processing server 10 extracts the attribute name of the attribute as the attribute-related term, it is possible to accurately acquire the attribute/attribute name included in the identical category. Still further, it is possible to extract web pages registered in a wrong category according to the attribute name.

Moreover, when the system control unit 14 of the information processing server 10 determines whether or not the attribute names are similar and aggregates attribute names which are determined to be similar, overlapping attribute names are removed, so that the attribute name can be more easily utilized.

Further, when the system control unit 14 of the information processing server 10 extracts the attribute name and attribute value matching the attribute name as the attribute-related terms, and aggregates the attribute names based on the attribute value, the attribute names are more easily aggregated according to the attribute value directly connected with the attribute name.

Furthermore, when the system control unit 14 of the information processing server 10 acquires a web page of a supply source of the target, extracts a supply source target attribute-related term from the web page of the supply source of the target by means of an initial data acquiring means, an attribute extracting means and an attribute description pattern extracting means, and compares the supply source target attribute-related term and attribute-related term, it is possible to more accurately acquire the attribute included in the identical category. Still further, by taking in official target information related to the target of goods or the like and determining the accuracy of the generated catalog, it is possible to improve reliability of the catalog.

Moreover, when the system control unit 14 of the information processing server 10 generates the catalog stating the attribute-related term based on the extracted attribute-related term, the user easily finds the target of desired goods or the like using the catalog related to the web page, so that it is possible to improve user convenience.

[4. First Modified Example of Operation of System of Generating Catalog of Goods or the Like]

Next, the first modified example of the operation of the system of generating a catalog of goods or the like will be described based on FIGS. 12 and 13.

The same or corresponding portions as the above embodiment will be assigned the same reference numerals, and operations thereof will be described. The same applies to the other modified examples.

Figure 12:
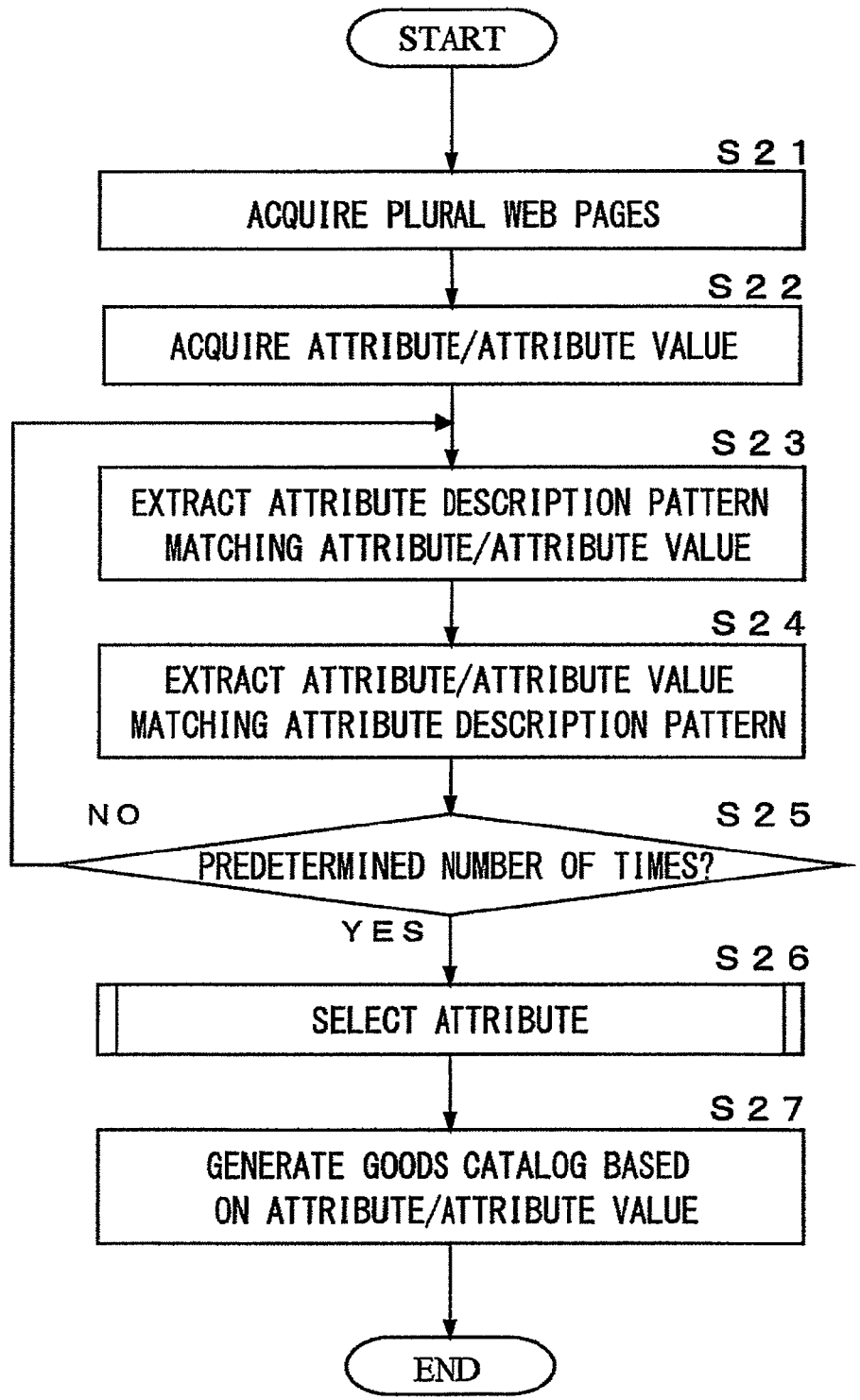
FIG. 12 is a flowchart illustrating an operation example of generating a catalog of goods or the like in FIG. 4 according to a first modified example.
Figure 13:
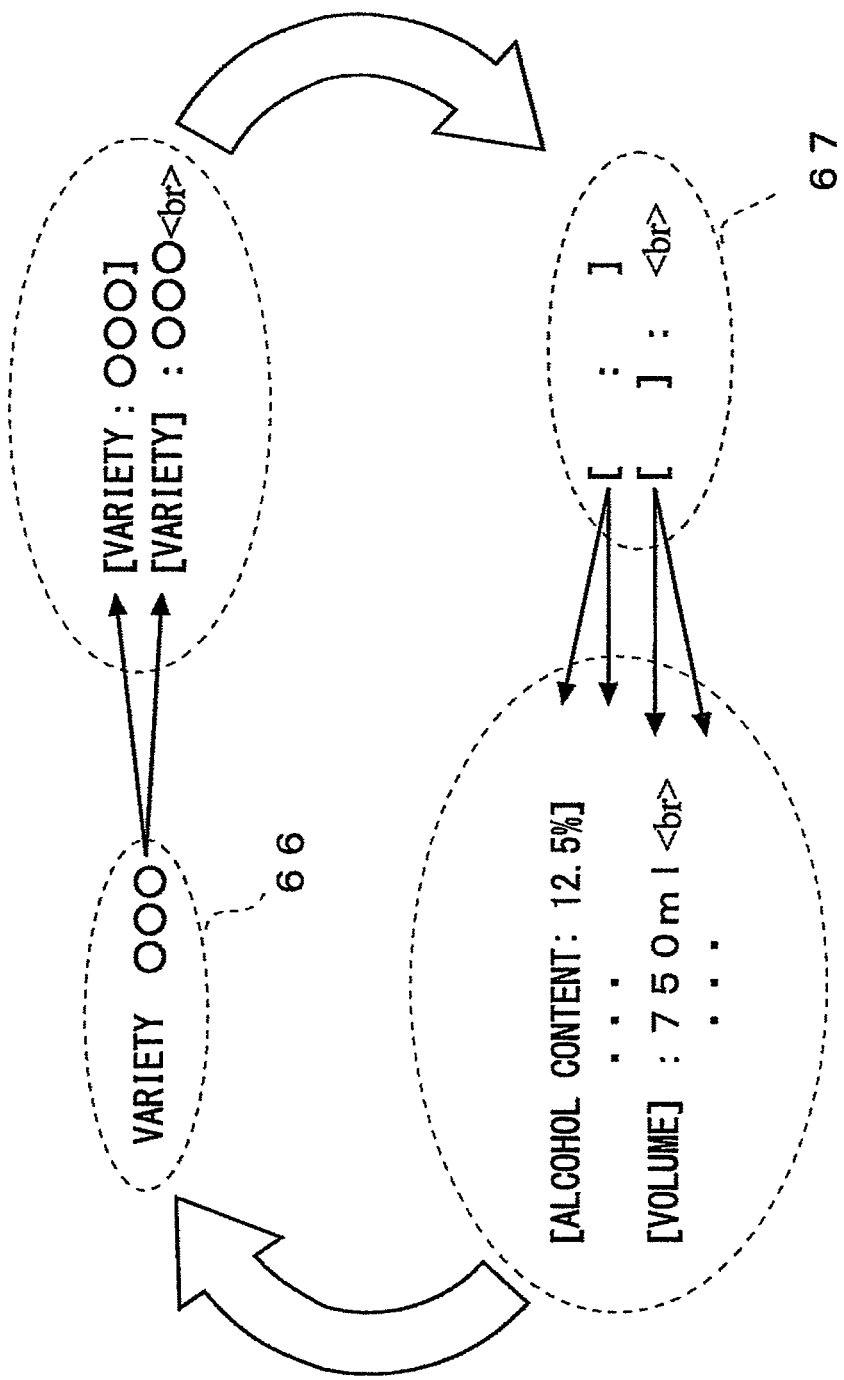
FIG. 13 is a schematic diagram illustrating an example of how an attribute/attribute value is extracted in FIG. 12 according to the first modified example.

FIG. 12 is a flowchart illustrating an operation example of generating a catalog of goods or the like according to the first modified example. FIG. 13 is a schematic diagram illustrating an example of how an attribute/attribute value are extracted according to the first modified example. As illustrated in FIG. 12, with the present modified example, initial data of the bootstrap method is an attribute/attribute value instead of the attribute description pattern. Steps S22 to S24 are different from the above embodiment. In addition, in the attribute/attribute value DB 12*b*, initial data of the attribute/attribute value are stored.

First, similar to step S1, the information processing server 10 acquires plural web pages (step S21).

Next, the information processing server 10 acquires an attribute/attribute value (step S22). Specifically, as illustrated in FIG. 13, the system control unit 14 of the information processing server 10 acquires the initial attribute/attribute value 66 as initial data of the bootstrap method in following steps S23 to S25, from the attribute/attribute value list of the attribute/attribute value DB 12*b*. As described above, the system control unit 14 of the information processing server 10 functions as an example of an initial data acquiring means to acquire the attribute-related term related to the attribute of goods as initial data.

Next, the information processing server 10 extracts the attribute description pattern matching the attribute/attribute value (step S23). Specifically, as illustrated in FIG. 13, the system control unit 14 of the information processing server 10 picks up a portion (for example, "[variety: ooo]") of the phrase matching, for example, the attribute/attribute value 66 from plural web pages such as the web page 50, and extracts, for example, the attribute description pattern "[:]". Further, the extracted attribute description pattern is stored in the attribute description pattern DB 12*a* as the attribute description pattern list. Here, the wild card and the attribute/attribute value are used to extract an attribute description pattern.

Next, the information processing server 10 extracts an attribute/attribute value matching an attribute description pattern (step S24). Specifically, as illustrated in FIG. 13, the system control unit 14 of the information processing server 10 picks up, for example, "[alcohol content: 12.5%"] matching an attribute description pattern 67 (for example, the front portion "[", middle portion ":" and rear portion "]" of the attribute description pattern, and extracts the attribute/attribute value from plural web pages such as web page 50. The extracted attribute/attribute value are added to the attribute/attribute value list, and stored in the attribute/attribute value DB 12*b*.

Following steps S25 to 28 are the same as in steps S5 to S8.

As described above, in steps S22 to S24, the system control unit 14 of the information processing server 10 executes: a web page acquiring step of acquiring plural web pages of an identical category in categories into which goods are classified; an attribute-related term acquiring step of acquiring an attribute-related term related to an attribute of goods; an attribute description pattern extracting step of extracting an attribute description pattern used to describe the attribute and matching the attribute-related term from plural web pages; and attribute-related term extracting step of further extracting the attribute-related term used for the attribute description pattern extracting means from plural web pages based on the extracted attribute-related term.

According to the present modified example, by acquiring plural web pages of an identical category in categories into which goods are classified, acquiring an attribute-related term related to an attribute of goods from the attribute/attribute value DB 12*b*, extracting an attribute description pattern used to describe the attribute and matching the attribute-related term from plural web pages, further extracting the attribute-related term used to extract the attribute description pattern from plural web pages based on the extracted attribute-related term, and generating a catalog of goods or the like stating the attribute-related term based on the extracted attribute-related term, the user can find a desired goods using the catalog of goods or the like related to a web page and, consequently, it is possible to improve user convenience.

[5. Second Modified Example of Operation of System of Generating Catalog of Goods or the Like]

Next, the second modified example of the operation of the system of generating a catalog of goods or the like will be described based on FIGS. 14 to 16. With the present modified example, in step of the bootstrap method, an attribute is selected, and an attribute description pattern is selected.

Figure 14:
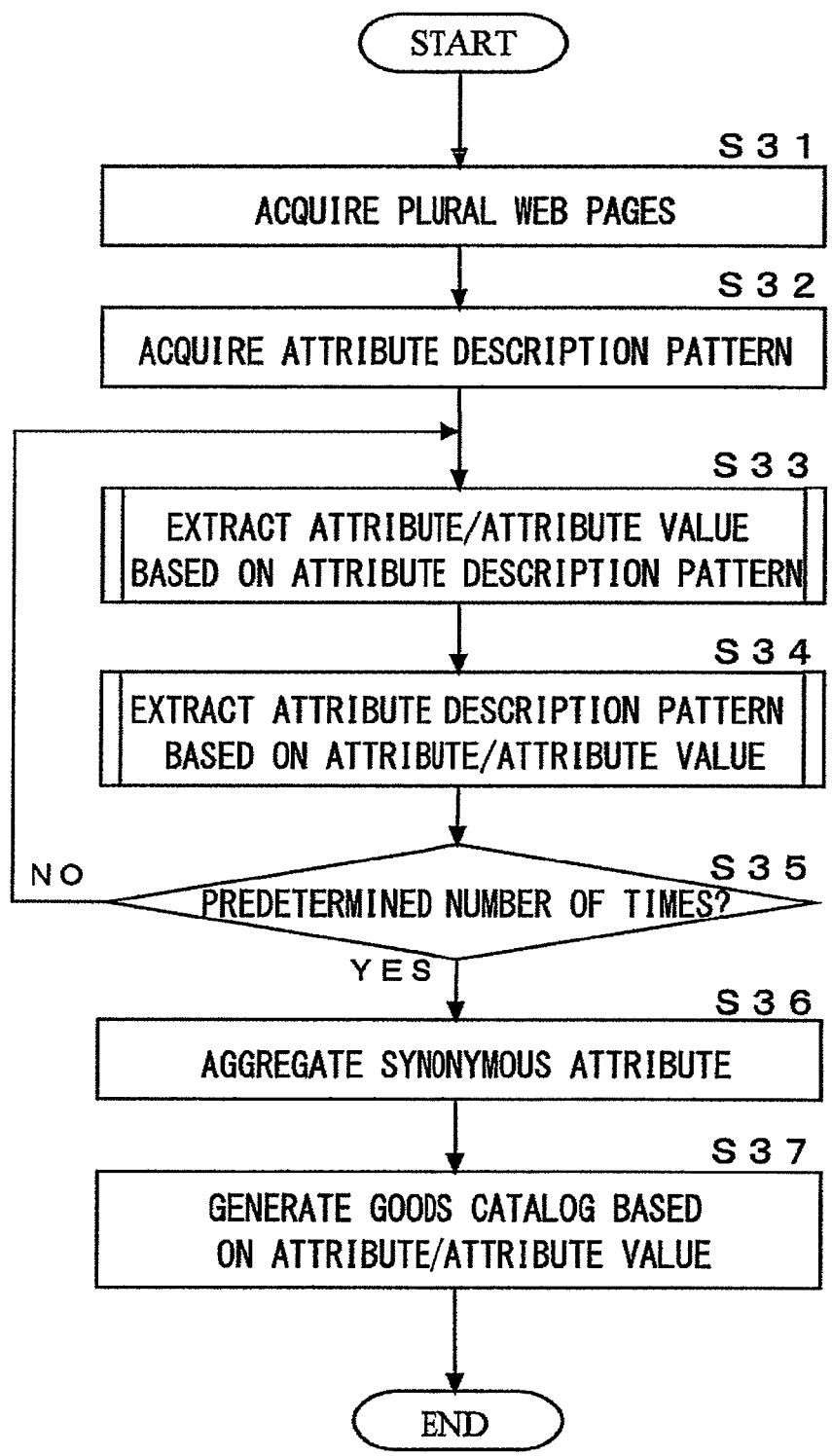
FIG. 14 is a flowchart illustrating an operation example of generating a catalog of goods or the like in FIG. 4 according to a second modified example.

FIG. 14 is a flowchart illustrating an operation example of generating a catalog of goods or the like according to the second modified example. FIG. 15 is a flowchart illustrating an example of a subroutine of attribute/attribute value extraction. FIG. 16 is a flowchart illustrating an example of a subroutine of attribute description pattern extraction.

(5.1. Flow of Extracting Web Page)

First, as illustrated in FIG. 14, similar to steps S1 and S2, the information processing server 10 acquires plural web pages (step S31), and acquires an attribute description pattern (step S32).

Next, the information processing server 10 extracts an attribute/attribute value based on the attribute description pattern (step S33). Specifically, the system control unit 14 of the information processing server 10 extracts the attribute/attribute value with the subroutine of attribute/attribute extraction. With the subroutine of attribute/attribute value extraction, the system control unit 14 of the information processing server 10 extracts an attribute/attribute value matching the attribute description pattern, scores attributes, selects an attribute of the upper rank and filters the attributes.

Next, the information processing server 10 extracts the attribute description pattern based on an attribute/attribute value (step S34). Specifically, the system control unit 14 of the information processing server 10 extracts the attribute description pattern with the subroutine of attribute description pattern extraction. With the subroutine of attribute description pattern extraction, the system control unit 14 of the information processing server 10 extracts the attribute description pattern matching the attribute/attribute value, calculates co-occurrence probability between the attribute description pattern and the attribute/attribute value, scores the attribute description pattern, and selects the attribute description pattern of the upper rank.

Next, similar to step S5, the information processing server 10 determines a predetermined number of times (step S35).

Next, the information processing server 10 aggregates synonymous attributes (step S36). Specifically, similar to step S13, the system control unit 14 of the information processing server 10 aggregates attribute names of synonymous attributes for the attribute names found by the bootstrap method in steps S33 to S35.

Next, similar to step S7, the information processing server 10 generates the catalog of goods or the like based on the attribute and attribute value (step S37).

(5.2. Attribute/Attribute Value Extraction)

Next, the subroutine of attribute/attribute value extraction will be described using FIG. 15.

Figure 15:
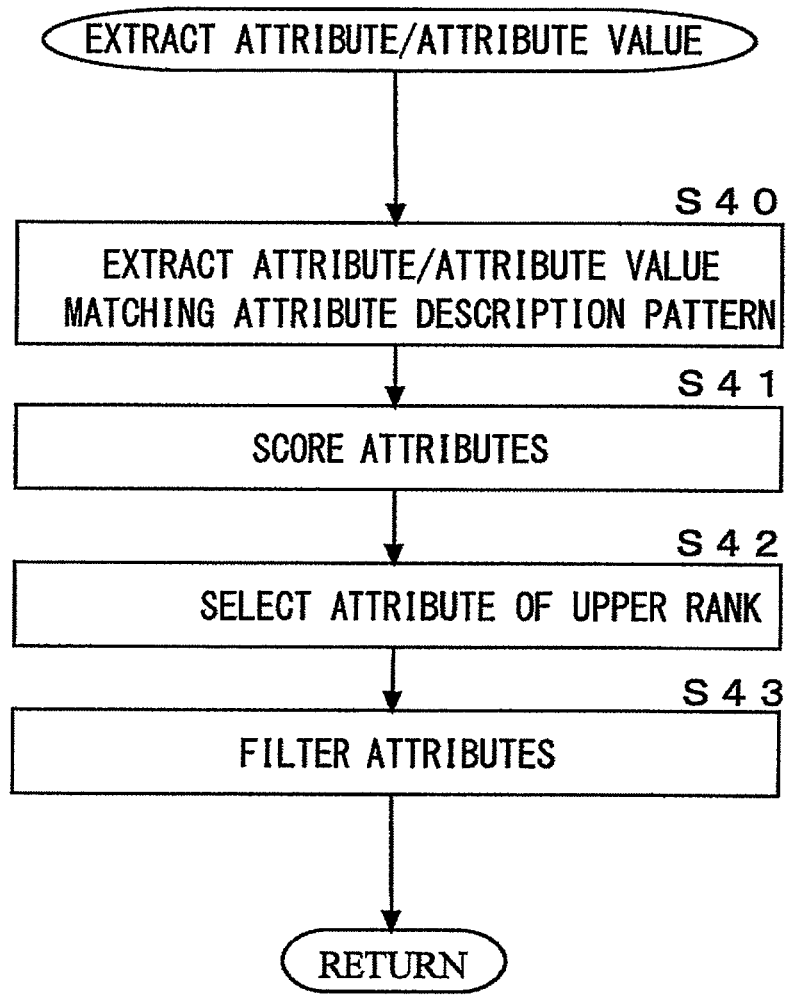
FIG. 15 is a flowchart illustrating an example of a subroutine of attribute and attribute value extraction in FIG. 14.

As illustrated in FIG. 15, the information processing server 10 extracts the attribute/attribute value matching the attribute description pattern (step S40). Specifically, similar to step S3, the system control unit 14 of the information processing server 10 extracts the attribute/attribute value matching the attribute description pattern.

Next, similar to steps S10 to S12 in the subroutine of attribute selection, the information processing server 10 scores attributes (step S41), selects an attribute of an upper rank (step S42) and filters attributes (step S43).

(5.3. Attribute Description Pattern Extraction)

Next, the subroutine of attribute description pattern extraction will be described using FIG. 16.

Figure 16:
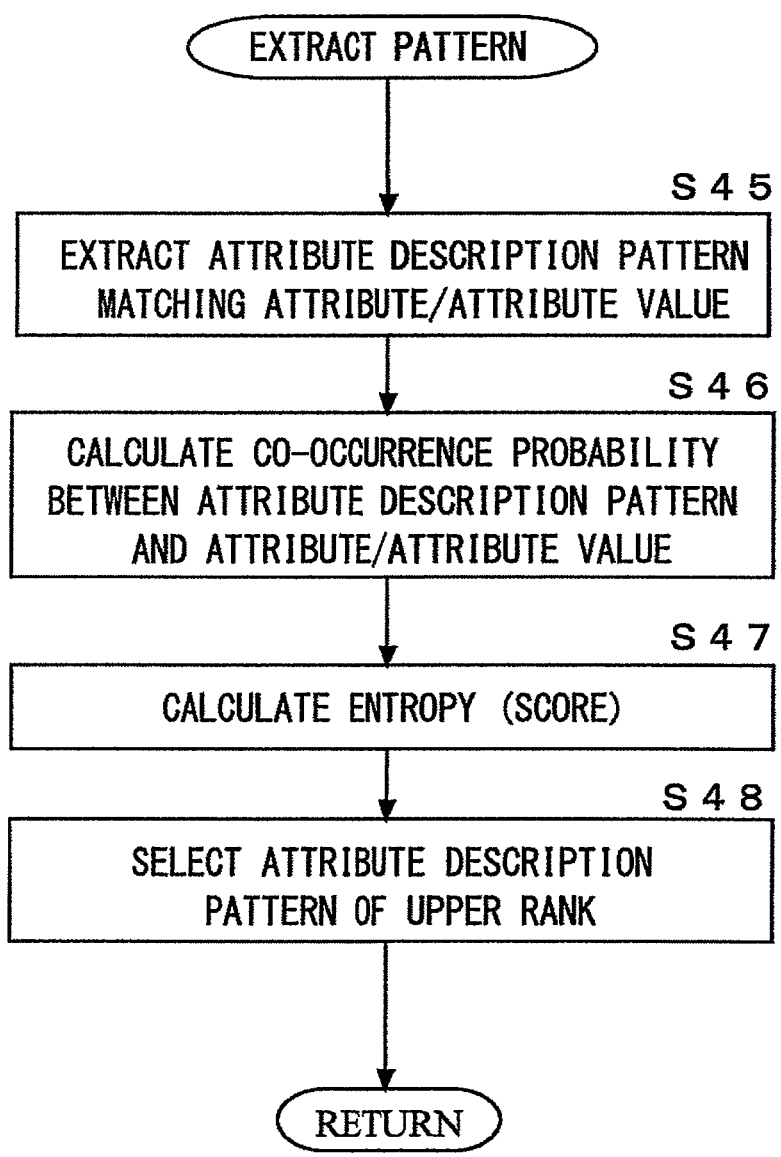
FIG. 16 is a flowchart illustrating an example of a subroutine of attribute description pattern extraction in FIG. 14.

As illustrated in FIG. 16, similar to step S4, the information processing server 10 extracts the attribute description pattern matching the attribute/attribute value (step S45).

Next, the information processing server 10 calculates the co-occurrence probability between the attribute description pattern and an attribute/attribute value (step S46). Specifically, the system control unit 14 of the information processing server 10 calculates a co-occurrence count f(i,t) of an attribute description pattern t and a pair i of an attribute/attribute value in plural web pages of an identical category of a target as an example of the co-occurrence count at which the attribute-related term and attribute description pattern appear together. Further, the system control unit 14 of the information processing server 10 calculates the probability that the attribute description pattern t and a pair of the attribute/attribute value co-occurs, that is, a co-occurrence probability Pt(i) of equation (1).

$$Pt(i)=f(i,t)/Nt \qquad (1)$$

Here, Nt is a number of the extracted attribute description patterns t.

Next, the information processing server 10 calculates an entropy (score) (step S47). Based on an assumption that an attribute description pattern which co-occurs with various attribute/attribute values is an adequate attribute description pattern, the system control unit 14 of the information processing server 10 calculates an entropy H(t) for the attribute description pattern according to equation (2).

$$H(t)=-\Sigma_{i \in I} Pt(i) \times \log_2 Pt(i) \qquad (2)$$

Here, I is a set of pairs of attributes/attribute values which has a pair i of an attribute/attribute value as an element, and T which has the attribute description pattern t as an element is an attribute description pattern set.

Next, the information processing server 10 selects an attribute description pattern of an upper rank (step S48). Specifically, the system control unit 14 of the information processing server 10 ranks the attribute description pattern of the highest entropy H(t) as a score, and selects the attribute description pattern of a predetermined rank or more. As described above, the system control unit 14 of the information processing server 10 functions as an example of an attribute description pattern scoring means to score the attribute description patterns. Further, the system control unit 14 of the information processing server 10 functions as an example of an attribute description pattern selecting means to rank the attribute description patterns in order of the score, and select the attribute description pattern of a predetermined rank or more. Furthermore, the system control unit 14 of the information processing server 10 functions as an example of an attribute description pattern scoring means to score the attribute description patterns based on the co-occurrence count at which the attribute-related term and attribute description pattern appear together.

In addition, steps S46 to S48 are used for the attribute description pattern list acquired until step S5 as step of selecting the attribute description pattern, and makes it possible to remove wasteful attribute description patterns.

As described above, with the present modified example, when the number of times of bootstrap is increased in particular, it is possible to prevent the extracted attribute/attribute value or attribute description pattern from increasing.

Further, when the system control unit 14 of the information processing server 10 scores attribute description patterns and selects the attribute description pattern of an upper rank, the accuracy of the attribute description pattern for extracting the attribute/attribute value increases.

Furthermore, when the system control unit 14 of the information processing server 10 scores the attribute description patterns based on the co-occurrence count at which the attribute-related term and attribute description pattern appear together, the accuracy of the score to select the attribute description pattern increases.

In addition, with the present embodiment and its modified examples, instead of the number of stores, the number of web pages in which an attribute name appears may be used for the score of the attribute. The system control unit 14 of the information processing server 10 functions an attribute scoring means to score attribute-related terms based on the number of hits of search of the attribute-related term. In this case, the present invention is applicable to those other than cyber malls in which lots of stores gather.

Further, by finding the attribute/attribute value of the target of each goods or the like from a web page of the supply source of the target of goods of goods or the like, the accuracy of the attribute/attribute value of the catalog of goods or the like may be determined based on these attribute/attribute value. In this case, by taking in official goods information related to the goods or the like and determining the accuracy of the generated catalog of goods or the like, it is possible to improve reliability of the catalog of goods or the like.

Figure 17:
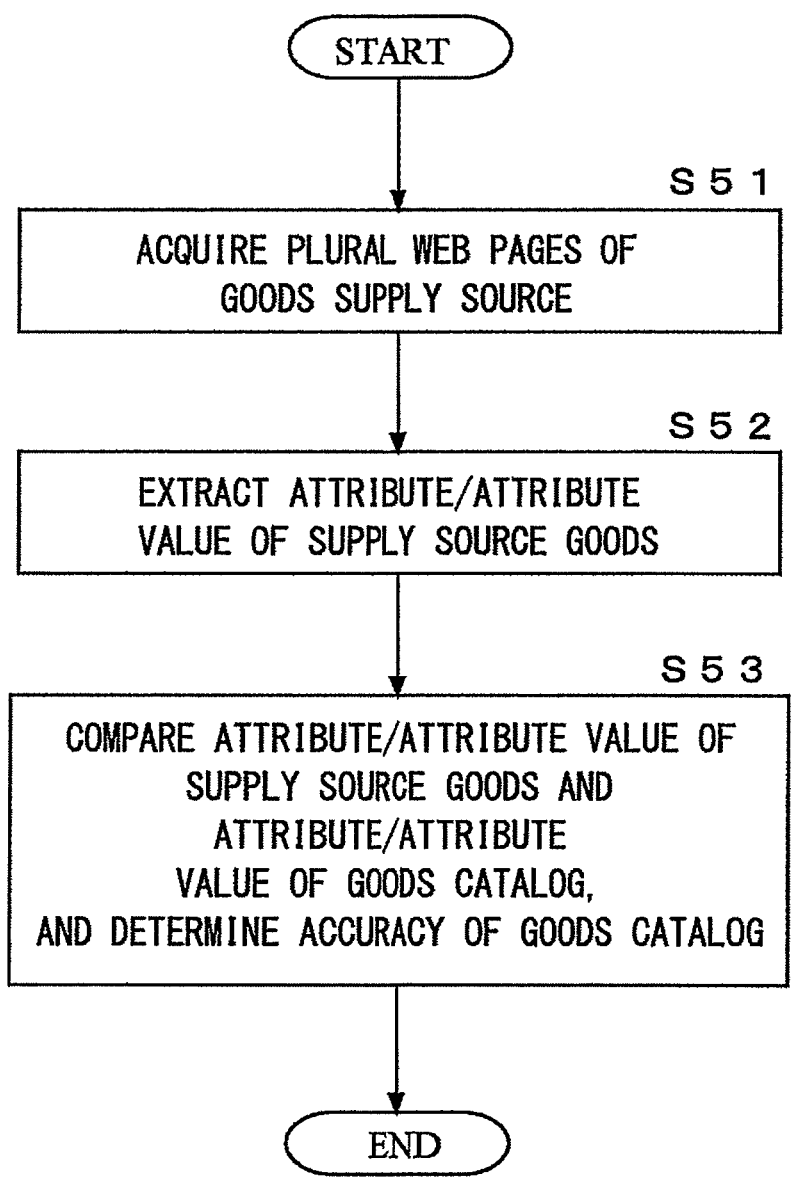
FIG. 17 is a flowchart illustrating an operation example of determining an attribute/attribute value in the information processing server in FIG. 1.

For example, as illustrated in FIG. 17, the information processing server 10 acquires a web page of the target supply source such as a production source or import distribution source of the supply source target of goods or the like, through a communication unit (step S51). Specifically, the system control unit 14 of the information processing server 10 acquires the web page of the supply source matching a goods ID of each goods or the like as illustrated in FIG. 18 referring to a URL or the like stored in the information DB 22a. In addition, the goods ID may be assigned to a web page in advance in a shopping site or extracted from text data of a web page. As described above, the system control unit 14 and communication unit 11 of the information processing server 10 function as an example of a web page acquiring means to acquire a web page of a supply source of a target of goods or the like.

Next, the information processing server 10 extracts the attribute/attribute value of the supply source goods (step S52). Specifically, as in steps S2 to S6, steps S22 to S26 or steps S32 to S36, the system control unit 14 of the information processing server 10 extracts the attribute/attribute value related to a web page of the goods supply source, from a web page of a goods supply source.

Next, the information processing server 10 compares the attribute/attribute value of the supply source target of the supply source goods or the like and attribute/attribute value of the catalog of goods or the like, and determines the accuracy of the catalog of goods or the like. Specifically, the system control unit 14 of the information processing server 10 compares and determines whether or not there is the attribute name of the supply source target of supply source goods or the like in the attribute names of the catalog of goods or the like, and, when there is the attribute name, compares and determines whether or not the attribute values match. Further, when there is little identical attribute name or when attribute values do not match, it is decided that the accuracy of the generated catalog of goods or the like is low. Furthermore, mismatch of the attribute values can be decided as an input error on the store side. Still further, predetermined values are set to the number of matched attribute names and the number of matched attribute values, and information of the catalog of goods or the like when the number is the predetermined value or more is configured to be browsed from the user terminal 35. As described above, when the system control unit 14 and communication unit 11 of the information processing server 10 extract a supply source target attribute-related term from a web page of a supply source of the target of goods or the like by means of an initial data acquiring means, an attribute extracting means and an attribute description pattern extracting means, and functions as an example of an attribute-related term comparing means to compare the supply source target attribute-related term and attribute-related term.

Next, a modified example of the generated catalog of goods or the like will be described using FIG. 19.

FIG. 19 is a schematic diagram illustrating an example of a generated catalog of goods or the like.

As illustrated in FIG. 19, the attribute value "1995" and attribute value "1996" are grouped for the attribute name "production year". For example, in steps S6, S26 and S36, the system control unit 14 of the information processing server 10 finds the attribute-related term, then collects web pages including the attribute value "1995" for the attribute name "production year", further collects web pages including the attribute value "1996" for the attribute name "production year", and groups information of plural web pages based on the attribute-related terms. As illustrated in FIG. 19, a goods name of the goods and other attributes are grouped according to the attribute name for the attribute name "production year".

When grouping plural web pages based on the attribute-related terms, the system control unit 14 of the information processing server 10 can aggregate web pages grouped according to common attributes. Further, search results which are easy for the user to see are reflected, so that a use value increases.

(Second Embodiment)

Next, the operation of the information processing system 1 according to the second embodiment of the present invention will be described using the attached drawings. In addition, the same or corresponding portions as the first embodiment will be assigned the same reference numerals, and only different configurations and functions will be described. The same applies to the other embodiments and modified examples.

[6. Operation of Web Page Extracting System According to Second Embodiment]

Next, the operation of the web page extracting system of the information processing system 1 according to the second embodiment of the present invention will be described using FIG. 20.

First, the flow of extracting web pages will be described using FIG. 20.

Figure 20:
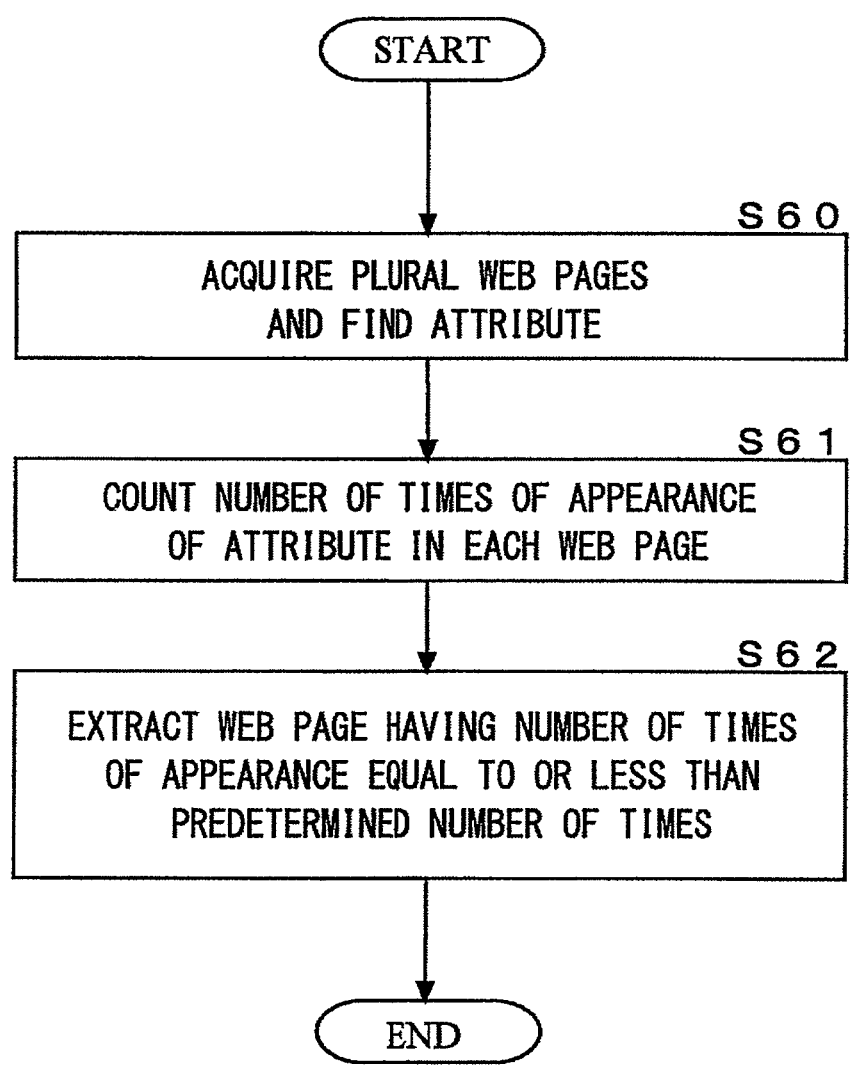
FIG. 20 is a flowchart illustrating an operation example of extracting a web page in an information processing system according to a second embodiment.

FIG. 20 is a flowchart illustrating an operation example of extracting web pages in an information processing system according to the second embodiment.

As illustrated in FIG. 20, the information processing server 10 acquires plural web pages, and finds the attribute (step S60). Specifically, similar to steps S1 to S6, the system control unit 14 of the information processing server 10 acquires plural web pages, and finds the attribute name and attribute value of the selected attribute. Alternatively, similar to steps S21 to S26, the system control unit 14 of the information processing server 10 acquires plural web pages, and finds the attribute name and attribute value of the selected attribute.

Next, the information processing server 10 counts the number of times of appearance of the attribute in each web page (step S61). Specifically, the system control unit 14 of the information processing server 10 counts the number of times of appearance of the attribute name of the selected attribute in each web page acquired in step S60. In addition, the number of times of appearance is counted taking synonyms of the aggregated attribute names into account.

Next, the information processing server 10 extracts web pages with the number of times of appearance equal to or less than a predetermined number of times (step S62). Specifically, in web pages acquired in step S60, the system control unit 14 of the information processing server 10 extracts web pages in which the number of times of appearance of the attribute name of the selected attribute is zero, that is, a web page in which the attribute name of the selected attribute does not appear. When there are plural attribute names, web pages in which any attribute names do not appear are extracted. The system control unit 14 of the information processing server 10 determines that the extracted web page is registered in a wrong category.

As described above, the system control unit 14 of the information processing server 10 functions as an example of a web page extracting means to extract web pages in which the number of times of appearance of the attribute-related term is a predetermined number of times or less from plural web pages. Further, the system control unit 14 of the information processing server 10 functions as an example of a web page extracting means to extract web pages in which the number of times of appearance of the attribute-related term is zero.

Next, the system control unit 14 of the information processing server 10 also applies steps S60 to S62 to web pages of other categories, and extracts web pages registered in a wrong category. Further, the system control unit 14 of the information processing server 10 transmits information related to the extracted web page to the store owner terminal 30 to notify the store owner, and moves the extracted web page to a correct category.

According to the present embodiment, by acquiring plural web pages of an identical category into which targets stated in web pages are classified, acquiring attribute-related term related to an attribute of the targets stated in the web pages or an attribute description pattern used to describe the attribute of the targets as initial data, extracting the attribute-related term of the attribute matching the attribute description pattern from plural web pages, extracting the attribute description pattern matching the attribute-related term from plural web pages, and extracting web pages in which the number of times of appearance of the attribute-related term is a predetermined number of times or less from plural web pages, it is possible to extract the web page registered in a wrong category. When, for example, goods of a wine cellar is registered in a category of wine, the probability is high that the attribute name such as "variety" which is one of attributes of wine does not appear in web pages related to the wine cellar. Further, when the attribute name of the attribute is extracted, it is possible to extract a goods web page registered in a wrong category based on the attribute name.

Furthermore, when the system control unit 14 of the information processing server 10 extracts web pages in which the number of times of appearance of the attribute-related term is zero, the probability is low that the attribute-related term appears in the web page registered in a wrong category, so that it is possible to easily extract web pages registered in a wrong category.

[7. First Modified Example of Web Page Extracting System]

Next, the first modified example of the operation of the web page extracting system will be described using FIG. 21. With the present modified example, in step of the bootstrap method, an attribute is selected, and an attribute description pattern is selected.

Figure 21:
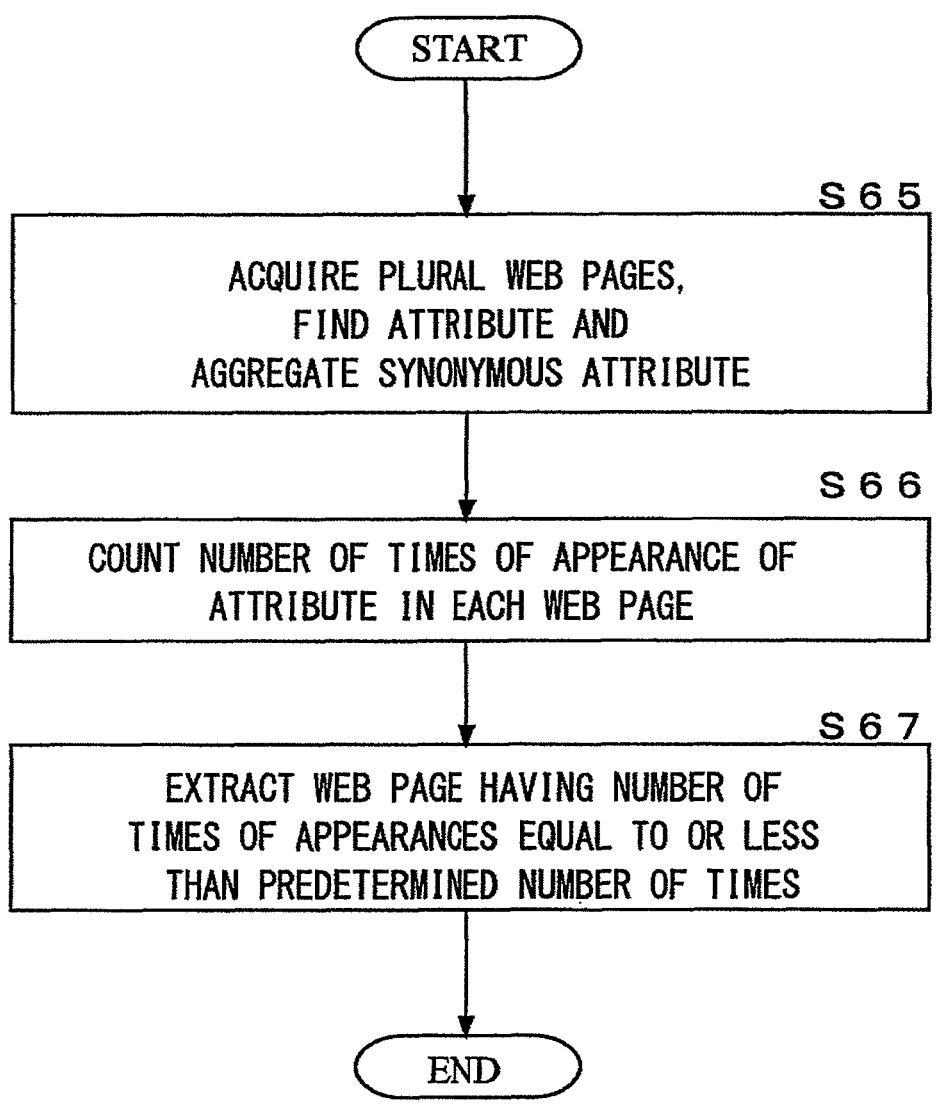
FIG. 21 is a flowchart illustrating an operation example of extracting web pages in FIG. 20 according to the first modified example.

FIG. 21 is a flowchart illustrating an operation example of extracting web pages according to the first modified example.

(5.1. Flow of Extracting Web Page)

First, as illustrated in FIG. 21, similar to steps S31 to S36, the information processing server 10 acquires plural web pages, finds the attribute and aggregates synonymous attributes (step S65).

Next, similar to steps S61 and S62, the information processing server 10 counts the number of times of appearance of the attribute name of the attribute of each web page (step S66), and extracts the web page in which the number of times of appearance is a predetermined number of times or less (step S67).

As described above, with the present modified example, when the number of times of bootstrap is increased in particular, it is possible to prevent the extracted attribute/attribute value or attribute description pattern from increasing.

Further, when the system control unit 14 of the information processing server 10 scores attribute description patterns and selects the attribute description pattern of an upper rank, the accuracy of the attribute description pattern for extracting the attribute/attribute value increases.

Furthermore, when the system control unit 14 of the information processing server 10 scores the attribute description patterns based on the co-occurrence count of the attribute-related term and attribute description pattern, the accuracy of the score to select the attribute description pattern increases.

In addition, with the present embodiment and its modified examples, instead of the number of stores, the number of web pages in which an attribute name appears may be used for the score of the attribute. As the attribute scoring means, the system control unit 14 of the information processing server 10 scores the attribute-related terms based on the number of hits of search of the attribute-related term. In this case, it is applicable to those other than cyber malls in which lots of stores gather.

Further, as the web page extracting means, the system control unit 14 of the information processing server 10 may extract web pages in which the rate of that the number of times of appearance is zero in plural attribute-related terms is a predetermined rate or more. Furthermore, even if the number of times of appearance of the attribute-related term is not zero, a web page may be extracted based on a little number of times of appearance.

Still further, the present invention is not limited to each of the above embodiments. Each of the above embodiments is exemplary, and any embodiment that has substantially the same configuration as a technical sprit stated in claims of the present invention and has the same operations and effects is incorporated in the technical scope of the present invention.

DESCRIPTION OF REFERENCE NUMERALS

3: NETWORK
5: SERVER SYSTEM
10: INFORMATION PROCESSING SERVER (INFORMATION PROCESSING APPARATUS)
12*a*: ATTRIBUTE DESCRIPTION PATTERN DB
12*b*: ATTRIBUTE/ATTRIBUTE NAME DB
20: INFORMATION PROVIDING SERVER
22*c*: GOODS OR THE LIKE CATALOG DB

The invention claimed is:

1. An information processing apparatus comprising:
a web page acquiring unit that acquires a plurality of web pages of an identical category into which a target item described in the plurality of web pages are classified;
an attribute extracting unit, implemented by a processor, that extracts an attribute-related term of the attribute matching an input attribute description pattern, from the plurality of web pages;
an attribute description pattern extracting unit that extracts an attribute description pattern matching an input attribute-related term from the plurality of web pages;
a data input unit that inputs an initial attribute description pattern in the attribute extracting unit, or inputs an initial attribute-related term in the attribute description pattern extracting unit;
an attribute scoring unit that scores the attribute-related term; and
an attribute selecting unit that ranks the attribute-related term in order of the score, and selects an attribute-related term of a predetermined rank or more,
wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit, and
wherein a website includes a plurality of stores which sell the target item, each of the stores having a web page in the website,
wherein the attribute scoring unit scores the attribute-related term by counting, as a first count, a number of stores, among the plurality of stores, whose web pages include the attribute-related term, and
wherein the attribute-related term having the first count, which is higher than a second count corresponding to another attribute-related term, is given a higher score than the other attribute-related term.

2. The information processing apparatus according to claim 1, wherein the attribute extracting unit extracts an attribute name of the attribute as the attribute-related term.

3. The information processing apparatus according to claim 1, further comprising:
an attribute list generating unit that generates an attribute list from the extracted attribute-related term; and
a pattern list generating unit that generates a pattern list of the extracted attribute description pattern.

4. The information processing apparatus according to claim 1, wherein the attribute scoring unit scores the attribute-related term based on a number of hits of search for the attribute-related term.

5. The information processing apparatus according to claim 1, further comprising an attribute filtering unit that removes the attribute-related term appearing in plural web pages of a category different from the category.

6. The information processing apparatus according to claim 1, further comprising:
an attribute description pattern scoring unit that scores the attribute description pattern; and
an attribute description pattern selecting unit that ranks the attribute description pattern in order of the score, and selects an attribute description pattern of a predetermined rank or more.

7. The information processing apparatus according to claim 6, wherein the attribute description pattern scoring unit scores the attribute description pattern based on a co-occurrence count that the attribute-related term and the attribute description pattern appear together.

8. An information processing apparatus comprising:
a web page acquiring unit that acquires a plurality of web pages of an identical category into which targets stated in web pages are classified;
an attribute extracting unit, implemented by a processor, that extracts an attribute-related term of the attribute matching an input attribute description pattern, from the plurality of web pages;
an attribute description pattern extracting unit that extracts an attribute description pattern matching an input attribute-related term from the plurality of web pages;
a data input unit that inputs an initial attribute description pattern in the attribute extracting unit, or inputs an initial attribute-related term in the attribute description pattern extracting unit;
an attribute name similarity determining unit that determines whether or not the attribute-related term is similar to another attribute-related term based a calculated degree of similarity; an attribute name aggregating unit that aggregates the attribute-related term and the other attribute-related term that are determined to be similar; and
a removing unit that removes the other attribute-related term when the attribute-related term is determined to be similar to the other attribute-related term,
wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit.

9. The information processing apparatus according to claim 8, wherein the attribute extracting unit extracts the attribute name and an attribute value matching the attribute name as the attribute-related terms, and the attribute name aggregating unit aggregates the attribute name based on the attribute name.

10. An information processing apparatus comprising:
a web page acquiring unit that acquires a plurality of web pages of an identical category into which targets stated in web pages are classified;
an attribute extracting unit, implemented by a processor, that extracts an attribute-related term of the attribute matching an input attribute description pattern, from the plurality of web pages;
an attribute description pattern extracting unit that extracts an attribute description pattern matching an input attribute-related term from the plurality of web pages;
a data input unit that inputs an initial attribute description pattern in the attribute extracting unit, or inputs an initial attribute-related term in the attribute description pattern extracting unit; and
an attribute-related term comparing unit that (i) extracts a supply source target attribute-related term from a web page of a supply source of the target, (ii) compares the supply source target attribute-related term and the attribute-related term, and (iii) determines the attribute-related term based on an official target information related to the target provided by the supply source of the target,
wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit.

11. The information processing apparatus according to claim 1, further comprising:
a catalog generating unit that generates a catalog that states the attribute-related term, based on the extracted attribute-related term; and
a catalog-accuracy determining unit that determines the accuracy of the generated catalog.

12. An information processing apparatus comprising:
a web page acquiring unit that acquires a plurality of web pages of an identical category into which targets stated in web pages are classified;
an attribute extracting unit, implemented by a processor, that extracts an attribute-related term of the attribute matching an input attribute description pattern, from the plurality of web pages;
an attribute description pattern extracting unit that extracts an attribute description pattern matching an input attribute-related term from the plurality of web pages;
a data input unit that inputs an initial attribute description pattern in the attribute extracting unit, or inputs an initial attribute-related term in the attribute description pattern extracting unit; and
a web page extracting unit that extracts web pages in which the number of times of appearance of the attribute-related term is equal to or less than a predetermined number of times from the plurality of web pages,
wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit, and
the web page extracting unit determines that an extracted webpage is registered in a wrong category when the number of times of appearance of the attribute-related term, which is associated with the wrong category, in the extracted webpage is zero, and removes the webpage from the wrong category.

13. The information processing apparatus according to claim 1, further comprising a web page attribute grouping unit that groups the plurality of web pages of the identical category based on the attribute-related term.

14. An information processing method of processing information in an information processing apparatus, the information processing method comprising:
- a web page acquiring step of acquiring a plurality of web pages of an identical category into which a target item described in the plurality of web pages are classified;
- an attribute extracting step of extracting an attribute-related term of the attribute matching an input attribute description pattern from the plurality of web pages;
- an attribute description pattern extracting step of extracting, by a processor, an attribute description pattern matching an input attribute-related term from the plural of web pages;
- a data input step of inputting an initial attribute description pattern in the attribute extracting step, or inputting an initial attribute-related term in the attribute description pattern extracting step;
- an attribute scoring step of scoring the attribute-related term; and
- an attribute selecting step of ranking the attribute-related term in order of the score, and selecting an attribute-related term of a predetermined rank or more,
- wherein, the data input step further inputs, when the attribute extracting step extracts the attribute-related term, the extracted attribute-related term in the attribute description pattern extracting step, or further inputs, when the description pattern extracting step extracts the description pattern, the extracted description pattern in the attribute extracting step, and
- wherein a website includes a plurality of stores which sell the target, each of the stores having a web page in the website,
- wherein the attribute scoring step scores the attribute-related term by counting, as a first count, a number of stores, among the plurality of stores, whose web pages include the attribute-related term, and
- wherein the attribute-related term having the first count, which is higher than a second count corresponding to another attribute-related term, is given a higher score than the other attribute-related term.

15. A non-transitory computer-readable recording medium having a program for an information processing apparatus recorded thereon that causes a computer to function as:
- a web page acquiring unit that acquires a plurality of web pages of an identical category into which a target item described in the plurality of web pages are classified;
- an attribute extracting unit that extracts an attribute-related term of the attribute matching an input attribute description pattern from the plurality of web pages;
- an attribute description pattern extracting unit that extracts an attribute description pattern matching an attribute-related term from the plurality of web pages;
- a data input unit that inputs an initial attribute description pattern in the attribute extracting unit, or inputs an initial attribute-related term in the attribute description pattern extracting unit;
- an attribute scoring unit that scores the attribute-related term; and
- an attribute selecting unit that ranks the attribute-related term in order of the score, and selects an attribute-related term of a predetermined rank or more,
- wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit, and
- wherein a website includes a plurality of stores which sell the target, each of the stores having a web page in the website,
- wherein the attribute scoring unit scores the attribute-related term by counting as a first count a number of stores, among the plurality of stores, whose web pages include the attribute-related term, and
- wherein the attribute-related term having the first count, which is higher than a second count corresponding to another attribute-related term, is given a higher score than the other attribute-related term.

16. An information processing method of processing information in an information processing apparatus, the information processing method comprising:
- a web page acquiring step of acquiring a plurality of web pages of an identical category into which targets stated in web pages are classified;
- an attribute extracting step of extracting an attribute-related term of the attribute matching an input attribute description pattern, from the plurality of web pages;
- an attribute description pattern extracting step of extracting, by a processor, an attribute description pattern matching an input attribute-related term from the plurality of web pages;
- a data input step of inputting an initial attribute description pattern in the attribute extracting step, or inputting an initial attribute-related term in the attribute description pattern extracting step;
- an attribute name similarity determining step of determining whether or not the attribute-related term is similar to another attribute-related term based a calculated degree of similarity; and
- an attribute name aggregating step of aggregating the attribute-related term and the other attribute-related term; and
- a removing step of removing the other attribute-related term when the attribute-related term is determined to be similar to the other attribute-related term,
- wherein, the data input step further inputs, when the attribute extracting step extracts the attribute-related term, the extracted attribute-related term in the attribute description pattern extracting step, or further inputs, when the description pattern extracting step extracts the description pattern, the extracted description pattern in the attribute extracting step, and
- wherein the attribute name aggregating step removes the attribute names that are determined to be similar.

17. An information processing method of processing information in an information processing apparatus, the information processing method comprising: a web page acquiring step of acquiring a plurality of web pages of an identical category into which targets stated in web pages are classified; an attribute extracting step of extracting an attribute-related term of the attribute matching an input attribute description pattern, from the plurality of web pages; an attribute description pattern extracting step of extracting, by a processor, an attribute description pattern matching an input attribute-related term from the plurality of web pages; a data input step of inputting an initial attribute description pattern in the attribute extracting step, or inputting an initial attribute-related term in the attribute description pattern extracting step; an attribute-related term comparing step of (i) extracting a supply source target attribute-related term from a web page of a supply source of the target, (ii) compares the supply source target attribute-related term and the attribute-related term, and (iii) determines the attribute-related term based on an official target information related to the target provided by the supply source of the target;

wherein, the data input step further inputs, when the attribute extracting step extracts the attribute-related term, the extracted attribute-related term in the attribute description pattern extracting step, or further inputs, when the description pattern extracting step extracts the description pattern, the extracted description pattern in the attribute extracting step.

18. An information processing method of processing information in an information processing apparatus, the information processing method comprising:

a web page acquiring step of acquiring a plurality of web pages of an identical category into which targets stated in web pages are classified;

an attribute extracting step of extracting an attribute-related term of the attribute matching an input attribute description pattern, from the plurality of web pages;

an attribute description pattern extracting step of extracting, by a processor, an attribute description pattern matching an input attribute-related term from the plurality of web pages;

a data input step of inputting an initial attribute description pattern in the attribute extracting step, or inputting an initial attribute-related term in the attribute description pattern extracting step; and a web page extracting step of extracting web pages in which the number of times of appearance of the attribute-related term is equal to or less than a predetermined number of times from the plurality of web pages, wherein, the data input step further inputs, when the attribute extracting step extracts the attribute-related term, the extracted attribute-related term in the attribute description pattern extracting step, or further inputs, when the description pattern extracting step extracts the description pattern, the extracted description pattern in the attribute extracting step, and the web page extracting step determines that an extracted webpage is registered in a wrong category when the number of times of appearance of the attribute-related term, which is associated with the wrong category, in the extracted webpage is zero, and removes the webpage from the wrong category.

19. A non-transitory computer-readable recording medium having a program for an information processing apparatus recorded thereon that causes a computer to function as:

a web page acquiring unit that acquires a plurality of web pages of an identical category into which targets stated in web pages are classified;

an attribute extracting unit that extracts an attribute-related term of the attribute matching an input attribute description pattern, from the plurality of web pages;

an attribute description pattern extracting unit that extracts an attribute description pattern matching an input attribute-related term from the plurality of web pages;

a data input unit that inputs an initial attribute description pattern in the attribute extracting unit, or inputs an initial attribute-related term in the attribute description pattern extracting unit;

an attribute name similarity determining unit that determines whether or not the attribute-related term is similar to another attribute-related term based a calculated degree of similarity; and an attribute name aggregating unit that aggregates the attribute-related term and the other attribute-related term; and a removing unit that removes the another attribute-related term when the attribute-related term is determined to be similar to the other attribute-related term, wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit, and wherein the attribute name aggregating unit removes the attribute names that are determined to be similar.

20. A non-transitory computer-readable recording medium having a program for an information processing apparatus recorded thereon that causes a computer to function as:

a web page acquiring unit that acquires a plurality of web pages of an identical category into which targets stated in web pages are classified;

an attribute extracting unit that extracts an attribute-related term of the attribute matching an input attribute description pattern, from the plurality of web pages;

an attribute description pattern extracting unit that extracts an attribute description pattern matching an input attribute-related term from the plurality of web pages;

a data input unit that inputs an initial attribute description pattern in the attribute extracting unit, or inputs an initial attribute-related term in the attribute description pattern extracting unit; and an attribute-related term comparing unit that (i) extracts a supply source target attribute-related term from a web page of a supply source of the target, (ii) compares the supply source target attribute-related term and the attribute-related term, and (iii) determines the attribute-related term based on an official target information related to the target provided by the supply source of the target, wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit.

21. A non-transitory computer-readable recording medium having a program for an information processing apparatus recorded thereon that causes a computer to function as:

a web page acquiring unit that acquires a plurality of web pages of an identical category into which targets stated in web pages are classified;

an attribute extracting unit that extracts an attribute-related term of the attribute matching an input attribute description pattern, from the plurality of web pages;

an attribute description pattern extracting unit that extracts an attribute description pattern matching an input attribute-related term from the plurality of web pages;

a data input unit that inputs an initial attribute description pattern in the attribute extracting unit, or inputs an initial attribute-related term in the attribute description pattern extracting unit; and a web page extracting unit that extracts web pages in which the number of times of appearance of the attribute-related term is equal to or less than a predetermined number of times from the plurality of web pages, wherein, the data input unit further inputs, when the attribute extracting unit extracts the attribute-related term, the extracted attribute-related term in the attribute description pattern extracting unit, or further inputs, when the description pattern extracting unit extracts the description pattern, the extracted description pattern in the attribute extracting unit, and the web page extracting unit determines that an extracted webpage is registered in a wrong category when the number of times of appearance of the attribute-related term, which is associated with the wrong category, in the extracted webpage is zero, and removes the webpage from the wrong category.

* * * * *